US009049117B1

(12) United States Patent
Nucci et al.

(10) Patent No.: US 9,049,117 B1
(45) Date of Patent: Jun. 2, 2015

(54) SYSTEM AND METHOD FOR COLLECTING AND PROCESSING INFORMATION OF AN INTERNET USER VIA IP-WEB CORRELATION

(75) Inventors: Antonio Nucci, San Jose, CA (US); Ramakrishna Keralapura, San Jose, CA (US); Joshua Robinson, San Francisco, CA (US); Supranamaya Ranjan, Albany, CA (US); Smriti Bhagat, Highland Park, NJ (US)

(73) Assignee: Narus, Inc., Sunnyvale, CA (US)

( * ) Notice: Subject to any disclaimer, the term of this patent is extended or adjusted under 35 U.S.C. 154(b) by 870 days.

(21) Appl. No.: 12/603,578

(22) Filed: Oct. 21, 2009

(51) Int. Cl.
*G06F 15/173* (2006.01)
*H04L 12/26* (2006.01)

(52) U.S. Cl.
CPC ............. *H04L 43/0811* (2013.01); *H04L 43/10* (2013.01)

(58) Field of Classification Search
CPC .......................... G06F 17/2715; G06F 17/2211
See application file for complete search history.

(56) References Cited

U.S. PATENT DOCUMENTS

| | | | | |
|---|---|---|---|---|
| 6,415,278 | B1* | 7/2002 | Sweet et al. ................... | 707/770 |
| 6,691,106 | B1* | 2/2004 | Sathyanarayan ....................... | 1/1 |
| 7,676,465 | B2* | 3/2010 | Poola ...................... | 707/999.005 |
| 8,060,538 | B2* | 11/2011 | Hall et al. ...................... | 707/803 |
| 8,484,173 | B1* | 7/2013 | Gengelbach ................... | 707/695 |
| 2002/0049738 | A1* | 4/2002 | Epstein .............................. | 707/1 |
| 2002/0147880 | A1* | 10/2002 | Wang Baldonado .............. | 711/1 |
| 2005/0131860 | A1* | 6/2005 | Livshits ............................ | 707/1 |
| 2006/0184566 | A1* | 8/2006 | Lo et al. .......................... | 707/102 |
| 2007/0013968 | A1* | 1/2007 | Ebaugh et al. ................. | 358/448 |
| 2008/0270038 | A1* | 10/2008 | Partovi et al. .................... | 702/19 |
| 2010/0005088 | A1* | 1/2010 | Zhang ................................ | 707/5 |
| 2010/0017360 | A1* | 1/2010 | Bansal et al. ....................... | 707/1 |
| 2010/0125738 | A1* | 5/2010 | Chang et al. .................. | 713/182 |
| 2011/0047605 | A1* | 2/2011 | Sontag et al. ....................... | 726/7 |

OTHER PUBLICATIONS

Payne, J. et al. "Grand Challenge Award: Interactive Visual Analytics—Palantir: The Future of Analysis." in: IEEE Symposium on Visual Analytics Science and Technology, 2008. (Oct. 19-24, 2008, Columbus, OH), pp. 201-202.
Gates, C. "Open Source Information Gathering." in: BruCON Security Conference [online], Sep. 19, 2009 [retrieved on Nov. 11, 2009]. Retrieved from the Internet: <http://www.brucon.org/material/Open%20Source%20Information%20Gathering%20BRUCON.pdf>.
"truVOICE Summary." Visible Technologies website [online], Sep. 2009 [retrieved on Nov. 2, 2009]. Retrieved from the Internet: <http://www.visibletechnologies.com/downloads/truVOICE_Summary.pdf>.

* cited by examiner

*Primary Examiner* — Ranodhi Serrao
*Assistant Examiner* — Thomas Richardson
(74) *Attorney, Agent, or Firm* — Kwan & Olynick LLP

(57) ABSTRACT

A method is provided for collecting and processing information of a target who is a user of a communication network. The method includes obtaining a first identifier of the target, accessing, based on a handle of the first identifier, a first public webpage associated with the target in a first Internet site identified based on a domain of the first identifier, extracting content of the first public webpage for including in target data of the target, obtaining a third identifier of the target, intercepting a document associated with the target from a private portion of communication network traffic identified based on a domain of the third identifier, extracting content of the document for including in the target data, determining a second identifier by searching the target data, associating the second identifier with the target based on a pre-determined criterion, and collecting information of the target based on the second identifier.

34 Claims, 6 Drawing Sheets

SYSTEM AND METHOD FOR COLLECTING AND PROCESSING INFORMATION OF AN INTERNET USER VIA IP-WEB CORRELATION

BACKGROUND OF THE INVENTION

1. Field of the Invention

The present invention relates to computers and computer networks. More particularly, the invention relates to collect and process information of an Internet user, referred to as target processing in Internet. The term "target" refers to a user (e.g., an individual) of the Internet being identified as a target for further potential identification as a suspect and/or an offender conducting malicious and/or unlawful Internet activities. Throughout this document, the terms "user", "individual", "suspect", and "target" may be used interchangeably depending on the context except where otherwise specified.

2. Background of the Related Art

The Internet is a global system of interconnected computer networks that use the standardized Internet Protocol Suite (TCP/IP) to serve billions of users worldwide. It is a network of networks that consists of millions of private and public, academic, business, and government networks of local to global scope that are linked by copper wires, fiber-optic cables, wireless connections, and other technologies. The Internet carries a vast array of information resources and services, most notably the inter-linked hypertext documents of the World Wide Web (WWW) and the infrastructure to support electronic mail. In addition it supports popular services such as online chat, file transfer and file sharing, gaming, commerce, social networking, publishing, video on demand, and teleconferencing and telecommunications. Voice over Internet Protocol (VoIP) applications allow person-to-person communication via voice and video.

Digital technologies and communications used in the Internet are rapidly changing the world and every aspect of our lives. Instant messaging, blogging, chatrooms, online shopping, banking, social networking, etc. have literally tightly integrated our daily lives with electronic transactions and activities. We refer to this world made of digital devices (optical fibers, routers, servers, switches, bridges, etc.,), digital languages (Internet protocols, applications and services), digital content (images, documents, text, voice, video, etc.) and digital users (i.e., users/consumers of digital content) as the "Cyber-World". Along with the Cyber-World's phenomenal growth has been a growth in computer-related crimes targeting consumers, business and governments. Fraud, identity theft, commercial and government espionage, extortion, and child endangerment are just a few manifestations of the new form of crime in the Cyber-World. The nature of Cyber-World crime presents complex new challenges for law enforcement with regards to identifying crimes before they occur, investigating them, collecting and analyzing evidences, identifying suspects, as well as apprehending and prosecuting offenders.

The counter-criminal/counter-terrorism communities (e.g., law enforcement agents (LEAs), or agents) currently use two different methods for monitoring the actions of a suspect. First, as per the interception rules prevalent in different countries, e.g., CALEA mandate in the United States, ETSI standard in Europe, etc., agents obtain a warrant against the suspect and then intercept the network traffic at various Internet Service Providers (ISPs). This allows them to intercept communications that involve a suspect's known accounts. Current state-of-art Lawful Intercept products intercept VoIP traffic, MMS and SMS messages, e-mail traffic, etc. Secondly, agents also look at publicly accessible information such as from the World Wide Web, to obtain more information on the suspect. This second step is usually executed by agents who make use of a search engine such as Google® (a registered trademark of Google, Inc., Inc., Mountain View, Calif.), YAHOO!® (a registered trademark of Yahoo!, Inc., Sunnyvale, Calif.) Search, etc. to search and parse through all the digital traces left by the suspect. The information retrieved is then loaded into a database where agents connect the dots by manually querying the database.

SUMMARY

There are three main problems with the current approach: (i) the queries will often return incomplete answers about the profile of a suspect because there is no common key that can be used to connect different accounts associated to the same individual, (ii) the process in use today assumes the agent knows exactly the "where" and "what" to search for about a suspect in order for him to generate the appropriate queries, and (iii) the agent is asked to know exactly "who" to search for.

In general the invention relates to a system and method of target processing via IP-Web correlation that executes (i) target development on an individual and (ii) target acquisition when focused on a broader community of individuals. The term target development refers to the problem of (i) creating a target profile through the collection, extraction and concatenation of electronic identifiers associated to the suspected target and spanning several information networks simultaneously; (ii) extracting the target associations network, which captures the network of individuals with whom the target has interacted with (i.e., relational associations), or individuals who share a common topic of interest with the target (i.e., topical associations), or individuals being traced to a set of cyber-locations and geo-locations where the target has been observed (i.e., spatial associations); and (iii) target attribution, i.e., attributing the identifiers associated with the target to the true identity of the living persona behind them (i.e., extracting the target identity by extracting the writing style of the author of a text-based document or extracting the voice characteristics of the caller in a VoIP call). Conversely, the target acquisition refers to the problem of discovering suspicious individuals who hide their presence and transactions behind virtual crowds (e.g., blogs, news, forums, chat rooms, etc.) and massive amount of legitimate transactions. More precisely, given a community of individuals, we aim at solving the following three subproblems: (i) identify individuals within the community with weak connectivity or completely disconnected to the community based on the number of transactions being observed (i.e., relational outliers), (ii) identify individuals who joined a specific language-spoken community but communicating with other individuals within the same community using a different language (i.e., language outliers) and (iii) identify individuals discussing topics within the community that do not fit the main topic around which the community gravitates (i.e., topical outliers).

The present invention leverages the strengths of both the IP (i.e., Internet Protocol) and Web domains, i.e., public information about an individual from the Web with the private information obtained via intercept of the IP traffic by opportunistically swapping back and forth between the two domains. While intercepting IP traffic provides much more fine-grained information about a suspect than can be obtained by looking for the suspect on the Web, it may not be successful in obtaining any information about the suspect in many cases. For example, IP intercept only provides deep insight into the actions of a suspect associated to the known set of his/her own identifiers. It is unrealistic to assume that the LEA is aware of the exhaustive list of all identifiers used by a suspect. On this regards, the present invention fulfills this gap by leveraging information on the web left by individuals in publicly accessible social networking sites, forums, blogs, or new sites. Also, IP intercept only provides perspective into the actions of a suspect starting from the point in time when the intercept is started. In such cases, publicly available information on the web can supplement information about the suspect by providing a historical perspective into his/her actions on the web, e.g., by crawling and looking for comments left by the suspect on forums, bulletin boards, chat rooms, etc. Another constraint is that IP intercept only provides a window into IP traffic at the network links currently being intercepted. Hence, if the suspect does not send any traffic through network links that are being monitored, e.g., when the suspect travels outside the city or country, then no information would be obtained about him/her. In these cases, the information trail left on the web by the suspect can be used to supplement what is known about him/her. As noted for IP data, the public web also does not provide all the answers needed when considered in isolation. Indeed, the web data is not typically as rich and fine-grained as IP data. For example, suspicious users are less likely to reveal their most personal information on public websites. On a similar note, private transactions do not leave any observable trace on the public Web. For example, e-mails, SMS, MMS, VoIP or any communication carried over social sites such as Facebook® (a registered trademark of Facebook, Inc., Palo Alto, Calif.), MySpace® (a registered trademark of Myspace, Inc., Beverly Hills, Calif.), etc., is considered private and thus not publicly accessible through the Web. As a consequence, web data also provides only fragmented snapshots of the suspect's activity. Conversely, IP data allows LEAs to intercept, parse, and analyze any these private communications and thus supplements the knowledge gap related to the public web.

In general, in one aspect, the invention relates to a method for collecting and processing information of a target comprising a user of Internet. The method includes obtaining a first identifier of the target, wherein the first identifier comprises a first domain and a first handle, accessing, based on the first handle, a first public webpage associated with the target in a first Internet site identified based on the first domain, extracting content of the first public webpage for including in target data of the target, wherein a plurality of portions of the target data of the target are associated with a plurality of parsing rules each pre-determined based on a source of the respective portion of the target data of the target, wherein the content of the first public webpage is extracted using a first parsing rule, of the plurality of parsing rules, associated with the first Internet site, determining, using a central processing unit (CPU) of a computer, a second identifier by searching the target data of the target using the plurality of parsing rules, wherein the second identifier comprises a second domain and a second handle, associating the second identifier with the target based on a pre-determined criterion, and collecting information of the target based on the second identifier.

In general, in one aspect, the invention relates to a computer readable medium computer readable medium embodying instructions when executed by the computer to collect and process information of a target comprising a user of Internet. The instructions include functionality for obtaining a first identifier of the target, wherein the first identifier comprises a first domain and a first handle, accessing, based on the first handle, a first public webpage associated with the target in a first Internet site identified based on the first domain, extracting content of the first public webpage for including in target data of the target, wherein a plurality of portions of the target data of the target are associated with a plurality of parsing rules each pre-determined based on a source of the respective portion of the target data of the target, wherein the content of the first public webpage is extracted using a first parsing rule, of the plurality of parsing rules, associated with the first Internet site, determining, using a central processing unit (CPU) of a computer, a second identifier by searching the target data of the target using the plurality of parsing rules, wherein the second identifier comprises a second domain and a second handle, associating the second identifier with the target based on a pre-determined criterion, and collecting information of the target based on the second identifier.

In general, in one aspect, the invention relates to a system for collecting and processing information of a target comprising a user of Internet. The system includes a repository storing a target profile of the target and target data of the target, wherein the target profile comprises a list of identifiers associated with the target, wherein the list of identifiers associated with the target comprises a list of identifiers belonging to the target and a list of identifiers belonging to associates of the target, a target data population engine comprising a web crawler configured to extract contents of Internet web pages based on the identifiers associated with the target for including in the target data of the target, wherein the contents of the Internet web pages are extracted using a plurality of parsing rules corresponding to the Internet web pages, a target data analysis engine comprising an identifier retrieval engine configured to associate an identifier of the identifiers with the target as belonging to the target, and an association retrieval engine configured to associate another identifier of the identifiers with the target as belonging to an associate of the target, a processor and memory storing instructions when executed by the processor comprising functionalities for obtaining a first identifier of the target, wherein the first identifier comprises a first domain and a first handle, accessing, based on the first handle, a first public webpage associated with the target in a first Internet site identified based on the first domain, extracting, using the web crawler, contents of the first public webpage for including in the target data of the target, wherein the contents of the first public webpage is extracted using a first parsing rule, of the plurality of parsing rules, associated with the first Internet site, determining a second identifier by searching the target data of the target using the plurality of parsing rules, wherein the second identifier comprises a second domain and a second handle, associating, using the target data analysis engine, the second identifier with the target based on a pre-determined criterion, and collecting information of the target based on the second identifier.

It is an objective of the present invention to remove the current need to have an agent to write queries against the data being collected and stored in the database. The system and method of the present invention collects, analyzes, connects the dots, alerts in real-time according to user defined rules, and export its findings into a case file report. As a consequence, the agent will have access to more fruitful, useful and complete information about the suspect in real-time.

It is another objective of the present invention to leverage many advanced analytic engines together in search for its answer. In the system and method of the present invention, each engine processes the data in a different way, and shares its findings with the other engines. As a consequence, the system is capable to provide more reliable answers to the agent as it leverages many vantage points together. For example, if an e-mail-body cannot be associated to a specific living persona with a high level of confidence (i.e., the authorship recognition engine analyzes a text-based document to infer who may the author be based on the writing style being extracted), information about which individuals often interact with the same e-mail-from identifier represent an additional source of information for the system and method of the present invention. Or, while a VoIP conversation between two individuals using unknown phone numbers may represent a road stop for agents in most of the cases, the biometric VoIP analysis (i.e., the speaker recognition engine analyzes the wave file of the voice call to infer who the caller and callee of such a call may be based on their voice characteristics) may reveal that one of these individuals is indeed a known individual to the agent who now is using a new phone number. Or, while retrieving the identity of an individual from the individual's cellphone number may be a challenging task in many circumstances (for example, the cellphone number is not listed on public and private websites), the pair of the individual's residence and business addresses may help to univocally identity the individual's name (i.e., the geo-location engine analyzes, among other things, the geographical trajectories associated to the same phone number and infers both the residence and working addresses as the place where the individual spends most of his/her time. Then by simply executing a reverse lookup using an online person/business directory service (e.g., whitepages.com), the system and method of the present invention may resolve which of the two is the individual's residence address as well as identify the individual's name.

It is still another objective of the present invention to allow additional analysis and/or alert engines to be integrated into the framework and automatically be in a position to share the information with other engines.

Other aspects and advantages of the invention will be apparent from the following description and the appended claims.

DETAILED DESCRIPTION

Figure 1A:
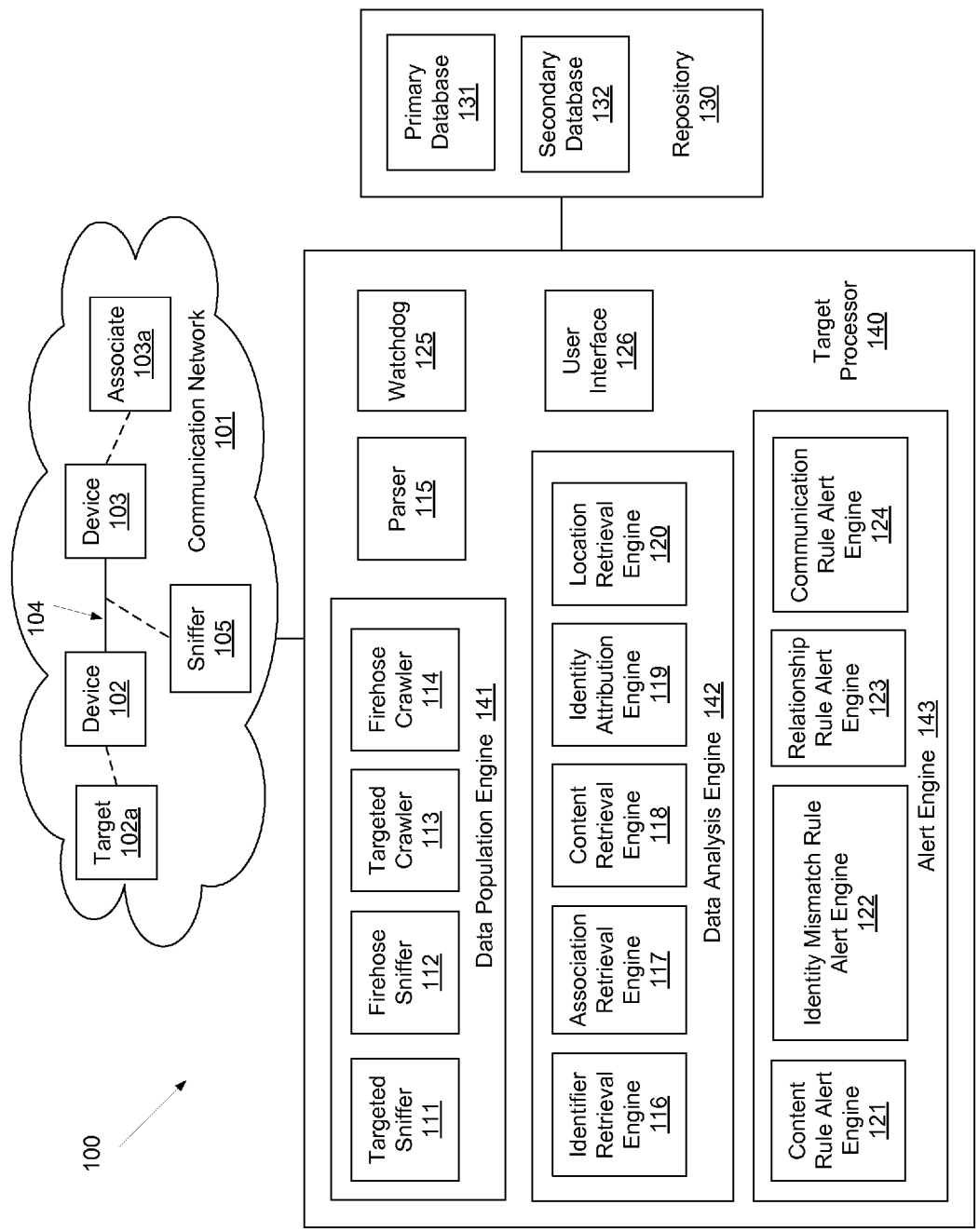
FIGS. 1A, 1B, and 1C show a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally speaking, the invention relates to a system and method for target processing via IP-Web correlation to address two main problems. Namely the target development problem and the target acquisition problem described in the summary section previously.
the Target Development Problem Today, there are multiple information and social networks among individuals, including both emerging as well as well-established networks. For example, postal and telephone networks are long established, whereas emerging networks include web, blogs, and instant chat networks (IM). Unfortunately, an individual in the Cyber-World goes beyond living in an isolated information network. Each network added in our analysis increases our knowledge about the user, i.e., who does he interact with and using which information network and with whom the most, or how does his profile change as he moves from one network to another, etc. It is clear that with this growth in the use of social networks and electronic communications, we should no longer think of a user on a site or blog service in isolation, but as part of a larger and more complex system linking multiple information networks. The target development problem, described previously in the summary section, can be decomposed into three different subproblems, closely linked together: target profile, target associations and target attribution.

"Target Profile" relates to discovering and chaining alpha-numerical identifiers to learn more about the same suspect.

Given that individuals have presence on many information (or communication) networks (e.g., chat-rooms, blog, news, social networking sites, e-mails, VoIP calls, MMS, etc.), discovering the "Target Profile" can be stated as the problem of discovering as many identifiers as possible about a suspect and associate them to the same suspect with a high level of confidence. Every single access to an Internet service is uniquely specified by the pair <domain,handle>, where the <domain> specifies the Internet service the user is accessing (e.g., <domain=gmail.com>), while <handle> is the nickname or username (s) he will use (e.g., <handle=honetest>). Note that for any Internet service, it is impossible that two distinct users A and B access the same service with the exact same pair (e.g., honetest@gmail.com). This would be true only in the case of account sharing, which is ignored for the time being. According to such definition of using the pair <domain,handle> as identifier of the suspect, the target processing via IP-Web correlation can create a target profile of a specific individual by merging all profiles of users for which it finds a common <domain,handle> pair. For example, user A on a blog website (e.g., Blogger.com) and user B on another blog website (e.g., Xanga.com) both list the same pair in their pages (e.g., <domain=gmail.com> and <handle=honetest>) and thus the system will assume that A and B are the same user and will merge all information retrieved about the two users into the same profile. Furthermore, it is common for most of the Internet users in blogs, news, forums, Internet cafe, etc., to actively participate in a discussion by using only a nickname, and most of the times such a nickname matches exactly (i.e., precisely) or almost exactly one of the <handle> they have listed somewhere in the Cyber-World (e.g., exact match of "honetest" being "honetest", while almost exact match being handles such as "honetest233", honetest0902", "honetestrustic" etc.). The target processing via IP-Web correlation may be configured with either of the two criteria (i.e., exact match or almost exact match) when creating the target profile of a suspect.

Generally speaking, identifiers may include email address, webpage login name, chat user name, social networking user name, telephone number, and voice over IP (VoIP) phone number. For the certain identifiers such as email address, the domain may be determined explicitly as the domain is explicitly specified in the identifier, i.e., after the "@" symbol.

For other identifiers such as webpage login name, chat user name, social networking user name, telephone number, and VoIP phone number, etc., the domain may be determined implicitly based on the structure of the identifiers and implicit relation to an associated service provider. For example, the domain of a VoIP number is related to the actual VoIP protocol (e.g., SIP, H.323, or Skype) and the service provider. This is because to target the usernames in IP traffic requires knowledge of the protocol to parse the VoIP identifier. Example identifiers include "SIP::123456789" or "Skype::my_username".

The case is similar with a chat username, we rely on having parsed information available which indicates the domain of the username. Examples of chat usernames could be "MSN::mustanglover", "AIM::pandabear", or "Jabber::helloguy". When we find the identifier in the webpage, the domain is implicit, and so we will use the format of the webpage to determine the domain. For example, in Facebook, you can list your chat identifiers in the "domain:username" format such as "MSN Username:MustangLover". The same is true of social networking accounts, Facebook usernames, MySpace usernames, or LinkedIn usernames where the domain is implicit.

Different targeting criteria provide a different breadth of insights into the activities of a suspect. For instance, knowing the MAC address of the device that is usually used by the suspect would provide the most stable targeting capability—even if the user were to obtain a new IP address by renewing his DHCP lease, his MAC address would not change. Moreover, MAC address targeting provides the most comprehensive targeting capability as LEAs can capture communication packets involving all layer-4 (TCP, UDP, etc.) and layer-7 protocols (HTTP, VoIP, IM, etc.) that the individual engages in. On the other hand, e-mail address based targeting is one of the least comprehensive targeting as LEAs can only obtain information about e-mails sent or received by the suspect using that particular e-mail address.

Generally speaking, expanding from one known identifier for a suspect to others by solely using IP intercept can be challenging. For sake of illustration, we consider the case of an e-mail service, using the precise <domain,handle> identifier and assume that the LEA knows only one e-mail address for the suspect and is interested in identifying other e-mail addresses used by him/her. There are three possible scenarios.

For the first two scenarios, assume that the interception is being done at the user's service provider (i.e., Internet service provider) and the suspect uses a webmail service, (e.g., Gmail® (a registered trademark of Google, Inc., Inc., Mountain View, Calif.), YAHOO !® (a registered trademark of Yahoo!, Inc., Sunnyvale, Calif.) Mail, etc.) to log on to two different mailboxes. Further, suppose that every time the suspect logs on to his network, he is provided a different IP address by the DHCP server at his service provider. Since LEAs only know one of his e-mail address, they will only be able to see traffic being exchanged using this e-mail address. The two scenarios we describe next lead to two contrasting outcomes. First, say the suspect logs on to a different webmail service in the same session as the one in which he also logged on to the targeted e-mail address. In this case, it is possible to associate the targeted e-mail address with the other e-mail address by using IP traffic only, since the same IP address would be used by the user while logging on to both the webmail services. Second, say, that after using the targeted e-mail address in his first session, the user logs off and then logs back again, though this time he is given a different IP address. Note that the LEA does not know any other credential to associate the suspect's first IP address with the second one, which would only have been possible if the LEA knew of the user's RADIUS identifier in the first place. Hence, the LEA would be unaware of the second e-mail address that was used by the suspect in the second IP session, and hence would not at all be able to associate the two e-mail addresses.

In the third scenario, let's assume that the LEA is intercepting traffic at an upstream provider of the suspect's access provider and instead of using a webmail service, this time the suspect uses his ISP's mail server for logging on to two different mailboxes. In this case, the problem of expanding from one known e-mail address to another one that belongs to the suspect, becomes even harder. At the carrier level, IP traffic that carries e-mails would be that between the user's mail server and the next-hop mail server. That is, the intercept product would not have seen the IP traffic that carried e-mail between the user and his mail server. Consequently, the intercepted e-mail traffic would only contain IP addresses of the two mail servers (user's mail server and next-hop mail server) and would not provide any idea about the IP address actually used by the user. Consequently, it would be impossible to identify from the several different e-mail addresses parsed from the SMTP or IMAP traffic, exactly those e-mail addresses which belong to the same person—unless the LEA also had a view into the IP traffic from the suspect's service provider and knew the suspect's (or target's) RADIUS identifier.

As described above, IP traffic interception can not be used by itself for identifying new targetable identifiers for a suspect. Conversely, the public web offers a gold-mine of information about Internet users that often leave rich trails of information spread across many different sites they engage activity on. For example, on public sites such as Blogger.com (i.e., one of the most used blog sites) and Flickr.com (i.e., one of the most used social networking sites), users tend to reveal much information about themselves, including access credentials to specific Internet services such as usernames, webpages they link into, e-mail addresses, Instant Messaging IDs, VoIP IDs and numbers, etc. Hence, we use the web to opportunistically extract additional identifiers for a known suspect and leverage the new information as novel targeting criteria to keep track of the suspect as he moves from one information network to another.

"Target Associations" relates to discovering the suspect accomplices, i.e., an associate of a target.

Knowledge of associations is useful in various application areas. For example, in law enforcement concerning organized crimes such as drugs, money laundering, or terrorism, knowing how the perpetrators are connected to one another would assist the effort to disrupt a criminal act or to identify additional suspects (or targets). The "Associates Retrieval Problem" aims at uncovering all accomplices (or associates) of a suspect or identifying all members of a nefarious organization so that traffic corresponding to all such members can be intercepted. The target processing via IP-Web correlation deals with three different types of associations, namely relational associations, topical associations and spatial associations.

Relational associations encompass the linkage among individuals who have interacted in the Cyber-world either directly, called "explicit association", or indirectly, called "implicit association". Two individuals A and B are said to be related via an explicit association either in case a direct Internet transaction is observed (e.g., an e-mail/MMS exchanged between A and B, or VoIP call place between A and B, etc.), or in case their relationship is explicitly declared and thus retrievable (e.g., A declares B to be one of his contacts in his Gmail® (a registered trademark of Google, Inc., Mountain View, Calif.), Hotmail (a registered trademark of Microsoft, Inc., Redmont, Wash.), etc. account, or A declares B as a friend in his Facebook Account® (a registered trademark of Facebook, Inc., Palo Alto, Calif.), or A declares B to be one of his connections in his LinkedIn (a registered trademark of LinkedIn, Ltd., Mountain View, Calif.) account). Conversely, A and B are said to be implicitly associated to each other when the association is made through a third party, the third party being a site, or individual. For example, A and B are implicitly associated if both post comments on the same blog, or read news on the same news site, or share a common connection. In order to retrieve such associations, it is imperative to have access to both IP and web data. Indeed, while IP traffic more readily reveals explicit associations, the broader historical and spatial perspective of the web enables the target processing via IP-Web correlation to discover the more stealthy and hidden implicit associations.

Topical associations define a linkage among individuals for which transactions about similar topical content have been observed. For example, A and B are said to be topical associates to each other in an explicit fashion in case they either have exchanged similar content through Internet transactions (e.g., A sends an e-mail to an individual about "nuclear fusion", and B, in a completely different transaction, sends an instant message to an individual on a similar topic) or they have explicitly declared similar interest (e.g., A and B declare the same interest in "motorcycles" in their social sites such as Facebook® (a registered trademark of Facebook, Inc., Palo Alto, Calif.) or Twitter® (a registered trademark of Twitter, Inc., San Francisco, Calif.)). As for the implicit relational associations, two individuals are said to be topical associated in an implicit fashion when their topical association is made through a third party (site or individual). For example, A and B post comments on "motorcycles" on two different blog sites, or A and B share two friends who declare similar interests in "motorcycles".

Finally, spatial associations define linkage among individuals who have shared a similar series of locations visited, either cyber locations such as the same news sites, or blog sites, or bulletin forums, or geographic locations, such as the same city or neighborhood. For example, two individuals who tend to visit the exact same blogs and news sites in which alarming information has been discovered may be symptomatic of individuals who are leveraging these sites to communicate or sync up on specific issues. Similarly, two individuals for whom no Cyber transaction can be traced but being observed at the same time in close-by physical locations may be an event to be aware of motivated by the fact that there is no reason to exchange any information in the Cyber world while they can meet in person in the real world. Alternatively, if a single individual appears in multiple, disparate locations at the same, this is indicative of account sharing or the use of proxies. An example of such cases is when an individual appearing in San Francisco at 8:30 am through the details of a web-session initiated by his iPhone® (a registered trademark of Apple, Inc., Cupertino, Calif.), and then appearing 30 minutes later in New York cashing some money from a ATM machine located in New York City.

"Target attribution" in the Cyber-World refers to connecting an electronic activity to a physical person, for example with certain confidence level.

Interactions in the physical world inherently carry the identity of the person originating the transaction. Generally speaking, physical traits are carried along in a transaction, for example when one purchases a book from a book store, the book dealer may remember the buyer's physical characteristics such as facial features or body build. In contrast, in the Cyber-World users have control over the link between their real world and their cyber-identities. That is, in the Cyber-World, users can unbundle identity from content and transactions. Attribution then consists of discovering the identity of the person behind an electronic transaction.

In one or more embodiments of the invention, target processing via IP-Web correlation employs a system architecture that accommodates two analytic modules, i.e., speaker recognition module for determining the identity of users behind a voice conversation and authorship recognition module for determine the author of a piece of text-based writing. Note that the target processing via IP-Web correlation architecture may also include other modules, such as facial recognition algorithms, etc. More details of the speaker recognition modules may be found in U.S. application Ser. No. 12/563,784 filed Aug. 6, 2009 and entitled "Hierarchical Real-time Speaker Recognition for Biometric VOIP Verification and Targeting".

In one or more embodiments, the speaker and authorship recognition modules are used as engines to reveal or verify the real identity of individuals anchored to suspicious transactions and hidden behind cold identifiers. Note that it is difficult to utilize strong evidence of malevolent, criminal or terrorist cyber transactions because there is not clear evidence that the identifiers used in those transactions can be clearly linked to the individuals being prosecuted in the real world. Second, both modules can be used as engines to retrieve new identifiers that could not be discovered otherwise. For example, in the case of a VoIP call being intercepted for which no knowledge about the caller or callee is available, the speaker recognition module could discover the caller and/or the callee to be suspects (or targets) already known to the LEAs, but now using two new VoIP phone numbers. The two new VoIP phone numbers could then be added to the list of known identifiers associated to the two suspects (or targets) whose identity has been revealed (i.e., increasing the information stored in the target profile of the suspect). Similarly, the authorship recognition module can operate on any text-based transactions (e.g., e-mails, chat sessions, blogs, MMS, instant messages, etc.) to discover the identities of the individuals involved in the transaction and thus discover new identifiers associated to authors of text-based documents.

Target Acquisition Problem

"Target Acquisition" refers to discovering suspicious individuals and transactions in Cyber-World.

The Internet has become a convenient facility for many unlawful activities due to the difficult in monitoring and tracking users. Criminals and terrorists discuss their plans on blogs, news sites, Internet cafe, forums, chat rooms, etc., hiding their identities in the crowd of legitimate Internet users and their communications in the vast amount of normal information. As of January 2009 there were more than 5,000 social networking sites and 300 million users, with up to 20 million users involved in simultaneous activity. The target processing via IP-Web correlation defines individuals to behave suspiciously based on three different criteria, namely relational, topical and language criteria.

The relational outliers are individuals who join a community and have the characteristic of being weakly connected with the other community members. For example, two users joining a technology group discussion that counts 100 active users. While all 100 users seem to interact to each other (some more, other less), the two new individuals tend to have a one-to-one conversation between them and never interact with any of the other 100 members. It is suspicious that these users may try to hide behind the crowded group discussion.

The topical outliers are individuals who join a community that gravitate around a specific topic, for example "technology", whose communications are about a completely different topic, e.g., chemicals. It is suspicious that these users may try to hide behind the crowded group discussion.

The language outliers are individuals who join a community and tend to speak a language different than the one being spoken by the community (e.g., Mandarin speaking individuals in an English-speaking community) or significantly different vocabulary (e.g., adults in a forum for children). It is suspicious that these users may try to hide behind the crowded group discussion.

Figure 1B:
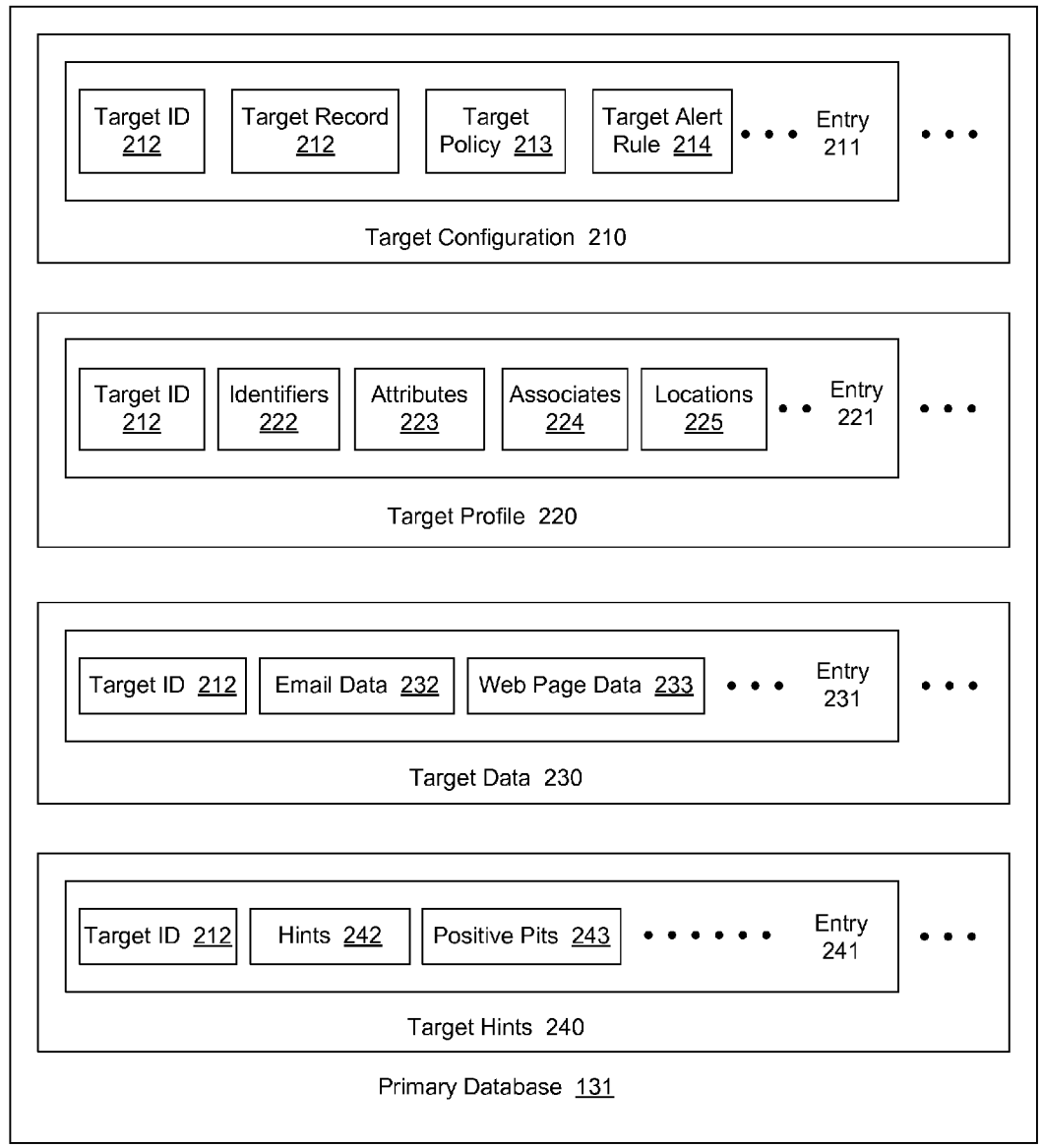
Figure 1C:
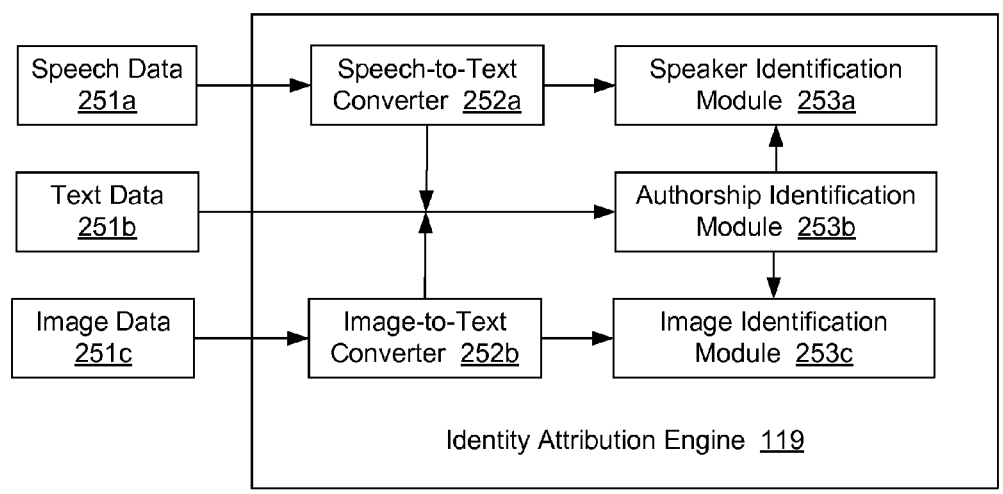

FIGS. 1A, 1B, and 1C show a system block diagram of a system (100) in accordance with one or more embodiments of the invention. Those skilled in the art, having the benefit of this detailed description, will appreciate the components shown in FIGS. 1A, 1B, and 1C may differ among embodiments of the invention, and that one or more of the components may be optional. Although specific numbers of components are shown in FIGS. 1A, 1B, and 1C, different number of each component may be included. In one or more embodiments of the invention, one or more of the components shown in FIGS. 1A, 1B, and 1C may be omitted, repeated, supplemented, and/or otherwise modified from that shown in FIGS. 1A, 1B, and 1C. Accordingly, the specific arrangement of components shown in FIGS. 1A, 1B, and 1C should not be construed as limiting the scope of the invention.

A shown in FIG. 1A, the system (100) includes communication network (101), target processor (140), and repository (130). In one or more embodiments of the invention, the communication network (101) includes the Internet and other voice/data communication networks (e.g., telephone networks, cellular phone networks, paging networks, radio communication network, etc.). In one or more embodiments, the communication network (101) includes devices (102, 103, etc.) used by respective users (102a, 103a, etc.) of the communication network (101) for communicating via a network link (104). For example, the user of the device (102) may be the target of the information collection/processing described above and is referred to as the target (102a). In addition, the user of the device (103) may be an associate of the target (102a) and is referred to the associate (103a). Examples of device (102, 103, etc.) includes desktop computers, notebook computers, servers, hand-held computers, mobile phones, gaming consoles, pagers, radios, or any device with voice/data network communication capabilities. Examples of the link (104) includes hardware, software, and/or combinations thereof related to data communications in the communication network (101) such as the copper wires, fiber-optic cables, wireless connections, and other technologies carrying communication data as well as the layered communications and computer network protocol software.

In one or more embodiments, the communication network (101) also includes sniffer (105) deployed to collect information of users (not shown) of the devices (102, 103, etc.) who are also users of the communication network (101). For example, the sniffer (105) may be a packet analyzer, network analyzer, protocol analyzer, Ethernet sniffer, wireless sniffer, telephone wiretapping device, or other wiretapping devices including computer software or computer hardware that can intercept and log traffic passing over a voice/data network or part of a network, for example the network link (104) as voice/data streams (not shown) flow across the network. The voice/data streams may be related to telephone conversation session, electronic mail, online chat, file transfer and file sharing, gaming, commerce, social networking, publishing, video on demand, teleconferencing and telecommunications, Voice over Internet Protocol (VoIP) applications, or other communication applications in the communication network (101). In one or more embodiments, the sniffer (105) operates in cooperation with the targeted sniffer (111) and the firehose sniffer (112) of the data population engine (141) in intercepting and logging the aforementioned voice/data streams in the communication network (101).

In one or more embodiments of the invention, the repository (130) includes primary database (131) and secondary databases (132), which include essentially the same data structure components. The main role of the primary database (131) and secondary databases (132) is to store information collected/retrieved by the database population engine (141) and the results obtained by the data analysis engine (142) and make it available to both the user interface (126) for off-line user-defined queries and to the watchdog (125) that keep informed respectively the database population engine (141) and the data analysis engine (142) of new targeting criteria being loaded into the database (either discovered or manually entered by the end user). The targeting criteria is a set of rules based on which the target processor (140) collects/retrieves information from the communication network (101) about a suspect (e.g., target (102a). The user of the device (102) may be specifically entered into the repository (130) as a target by the user of the target processor (140) and referred to as the target (102a). Such mode of operation is referred to as target development mode of the target processor (140). Alternatively, the user of the device (102) may be automatically identified by the target processor (140) and entered into the repository (130) as a target and referred to as the target (102a). Such mode of operation is referred to as target acquisition mode of the target processor (140). More details of the database population engine (141), the data analysis engine (142), the user interface (126), and the watchdog (125) are described below.

In one or more embodiments, as shown in FIG. 1B, primary database (131) of the repository (130) includes a target profile (220) of a target (102a) and target data (230) of the target (102a), while the target profile includes entries (221, etc.). In one or more embodiments, a portion of the entries (221, etc.) form a list of identifiers associated with the target (102a), which includes a list of identifiers belonging to the target (102a) and a list of identifiers belonging to associates (103a) of the target (102a). More details of the target profile (220), target data (230), and additional components of the primary database (131) are described in reference to FIG. 2 below.

Generally speaking, the target processor (140) may be used by a LEA as a user of the target processor (140). Returning to FIG. 1A, the target processor (140) includes a bank of engines responsible for collecting, organizing, and normalizing the data (e.g., from the public web and IP traffic) according to a set of criteria specified by the user of the target processor (140). Note that the user of the data processor (140) is distinct from the user of the communication network (101) or the devices (102, 103, etc.) who may be a target investigated by the target processor (140). The set of criteria (i.e., targeting criteria) are defined through a user interface by the user of the data processor (140). The information collected by these engines is then loaded into the primary database (131) and/or the secondary database (132) for use by the processing engines for analysis and alerting.

In one or more embodiments of the invention, the target processor (140) includes the target data population engine (141), the data analysis engine (142), the alert engine (143), the parser (115), the watchdog (125), and the user interface (126).

In one or more embodiments of the invention, the target data population engine (141) includes one or more web crawlers (113, 114) and one or more sniffers (111, 112).

In one or more embodiments, the sniffers (111, 112) are configured to extract, in cooperation with the sniffer (105), contents of documents (e.g., email, phone conversation, etc.) intercepted from private portions of communication network traffic (e.g., voice/data streams flowing of the network link (104)) based on the identifiers (e.g., email address, telephone number, mobile phone number, VoIP phone number, etc.)

associated with the target (102a) for including in the target data (230) of the target (102A), while the contents of the documents are extracted using parsing rules corresponding to the private portions of communication network traffic. In one or more embodiments, the parsing rules are used by the parser (115) to parse the intercepted contents for the sniffers (111, 112). For example, the parsing rules include email data scraping and speech-to-text conversion techniques known to those skilled in the art as well as VoIP profiling and speaker recognition techniques described in U.S. patent application Ser. No. 12/334,926 filed Dec. 15, 2008 entitled "VoIP Traffic Behavior Profiling Method" and U.S. patent application Ser. No. 12/563,783 filed Aug. 6, 2009 entitled "Hierarchical Real-Time Speaker Recognition for Biometric VoIP Verification and Targeting". Specifically, each of the parsing rules is based on the structures of a particular email service provider or telephone/mobile phone/VoIP phone number of which associated contents are extracted.

In one or more embodiments, the targeted sniffer (111) uses the sniffer (105) to sniff raw packets directly from the monitored link (104) and reconstructs full IP sessions and searches, within each session, information about the suspect as specified by the targeting criteria. For example, the user of the target processor (140) may start by providing an email address (e.g., hone.te@aol.com) as a targeting criterion. Accordingly, the targeted sniffer (111) searches for this email address after reconstructing all IP sessions. The email address may be used as the login credential of a user named Hone Te while accessing his private webpage on the social networking site Facebook. The targeted sniffer (111) then collect this entire HTTP session, parse it using the parser (115), extract all meaningful information about the individual such as other identifiers (e.g., Skype ID, other email addresses, etc.), the individual's friends, blogs subscribed to, etc., load the structured findings into the primary database (131) and made available to the data analysis engine (142).

In one or more embodiments, the web crawlers (113, 114) are configured to extract contents of Internet web pages (not shown) based on the identifiers (222) (e.g., an universal resource identifier (URL) of the web pages having domain/handle described above) associated with the target (102a) for including in the target data (230) of the target (102a), while the contents of the Internet web pages are extracted using parsing rules corresponding to the Internet web pages. In one or more embodiments, the parsing rules are used by the parser (115) to parse the contents of Internet web pages for the web crawlers (113, 114). For example, the parsing rules include web page data scraping techniques known to those skilled in the art. Specifically, each of the parsing rules is based on the structures of a particular Internet web page of which the contents are extracted.

In one or more embodiments, the target crawler (113) crawls public web in search for data about the target (102a), e.g., an individual Hone Te. For example while crawling and parsing specific web pages, the target crawler (113) may find hone.te@aol.com to be the login email address listed by the same individual, Hone Te, on his public blogger.com page. Accordingly, such data from Hone Te's public blogger.com page is loaded into the primary database (131) and provided to the data analysis engine (142).

In one or more embodiments, the firehose crawler (114) and the firehose Sniffer (112), are similar in function to the targeted crawler (113) and the targeted sniffer (111), but rather than being driven by a precise targeting criteria (i.e., an identifier such as email address, phone number, AIM, Skype ID, etc.), the firehose crawler (114) and the firehose Sniffer (112) receive a broader targeting criteria such as a 24×7 crawling, sniffing, and parsing of all private Gmail, Facebook, MySpace, MMS, etc. sessions. Note that no specific identifier is provided as the goals are to parse and store into the secondary database (132) all webpages and private sessions associated to specific Internet services. As a consequence, while the targeted crawler (113) and the targeted sniffer (111) operate in what we define as Hone's main data paths, the firehose crawler (114) and the firehose Sniffer (112) operate in Hone's secondary data path. The information being stored into the secondary database (132) is then used as an alternative repository of data together with real-time IP traffic (provided by the targeted Sniffer (111)) and public webpages (provided by the targeted crawler (113)).

In order to better understand the importance of the firehose sniffer (111) and the firehose crawler (113), consider the case of the same individual, Hone Te, having a secondary identity, e.g., Mark Brown, when accessing his MySpace account. Assume that Hone Te accesses MySpace using an unknown identifier mbrown01@gmail.com. Since this identifier has not being entered as a targeting criterion, the target processor (140) would have missed the valuable MySpace session. With the usage of the firehose sniffer (112), all MySpace sessions are recorded, parsed, and loaded into the secondary database (132). In order to selectively retrieve records associated to specific data sessions from the secondary database (132), the watchdog (125) is configured to keep the firehose crawler (114) always informed about the latest set of active target criteria. Now, if we assume that a common identifier does exist between the blogger.com session and the MySpace session (e.g., MSN: mustanglover) and that the new identifier would be automatically inserted by the target processor (140) as a targeting criteria for Hone Te (thus present in the watchdog (125)), then the firehose crawler will (113) search the secondary database (132) for MSN:mustanglover and report to the data analysis engine (142) the critical MySpace session that could be leveraged to make the connection that Hone Te and Mark Brown are, indeed, the same person.

As described above, the parser (115) is used by the data population engine (141) to retrieve new data related to the target (102a) and then pass this data along to the data analysis engine (142) for processing. In one or more embodiments of the invention, the output of parser (115) is a vector of newly found data elements along with a tag for each data element inserted by the parser (115). This tag indicates a target (e.g., 102a) ID the data applies to as well as types of data, such as a profile attribute, an email, a username, an address book entry, etc. The vector also indicates the network service (e.g., Facebook, Gmail, blogger, etc.) that generated the new data. In one or more embodiments, the input and output of the data analysis engine (142) are in the same format as these vectors, i.e. a set of data elements and tags belonging to one session at either the IP flow level or public web download.

Generally speaking, the data analysis engine (142) is composed of a bank of analysis engines that aim at constructing a case file (i.e., a set of hints) against the suspect based on the information that target processor (140) finds about the suspect. Additionally, the alerting engine (243) uses these hints to generate alerts for which a rule has been created by the user of the data processor (140), i.e., implying that these hints represent "alarming facts about the suspect" that the user of data processor (140) would like to be aware of. We refer to hints for which a rule is matched as positive hits.

In one or more embodiments of the invention, the target data analysis engine (142) includes an identifier retrieval engine (116) configured to associate an identifier (not shown) related to the target (102a) as belonging to the target (102a) and an association retrieval engine (117) configured to associate an identifier (not shown) related to the target (102a) as belonging to an associate (103a) of the target (102a). In addition, the target data analysis engine (142) includes content retrieval engine (118), identify attribution engine (119), and location retrieval engine (120).

In one or more embodiments of the invention, the identifier retrieval engine (116) chains identifiers associated to the same suspect according to pre-defined policies stored in target configuration (210) of the primary database (131), as described in reference to FIG. 1B.

Generally speaking, the identifier retrieval engine (116) performs the core target development task of examining new data (collected from both IP and Web) and identifying electronic identifiers (IDs) associated to a target (e.g., target (102a)) being entered into the repository (130). As described above, each single access to an Internet service is uniquely specified by the pair <domain,handle>, where the <domain> specifies the Internet service the user is accessing (e.g., <domain=gmail.com>), while <handle> is the nickname or username the user uses (e.g., <handle=honetest>). Note that for any Internet service, it is impossible that two distinct users A and B access the same service with the exact same pair (e.g., the honetest@gmail.com). The case of account sharing is not considered in the scope of this document.

According to such definition, the target processor (140) creates a target profile of a specific individual by merging all profiles of users for which it finds a common pair <domain, handle>. For example, user A on Blogger.com and user B on Xanga.com both list the same pair in their pages (e.g., <domain=gmail.com> and <handle=honetest>), the target processor (140) will assume that A and B are the same user and will merge all information retrieved about the two users into the same profile.

Furthermore, it is common for most of the Internet users in blogs, news, forums, Internet cafe, etc., to actively participate in a discussion by using only a nickname, and most of the times such a nickname matches exactly or almost exactly to one of the <handle> they have listed somewhere in the CyberWorld (e.g., exact match being "honetest", while almost exact match (i.e., similar) being handles such as "honetest233", "honetest0902", "honetestrustic" etc.). In one or more embodiments, the previous definition of an identifier is expanded in the identifier retrieval engine (116) to merge all profiles of users for which it finds an exact or almost exact match of <handle> between them thus ignoring the <domain> part.

In order to increase the level of confidence in merging information associated with only matches of similar handle type, the identifier retrieval engine (116) is supplemented with an extra level of intelligence. In one or more embodiments, the identifier retrieval engine (116) further analyzes the handles, (i.e., "honetest233" and "honete0902"), in search for meanings to attribute to 233 or 0902. For example, it may find that 233 refers to Hone Te's home residence number, and 0902 refers to Hone Te's date of birth. Similarly, it may find that the portion "rustic" of the handle "honeterustic" may be indicative of Hone Te's residence address (e.g., residing at the 233 Rustic Drive, etc.).

Although the example given above describes analyzing text inputs, in one or more embodiments, the identifier retrieval engine (116) is configured to search for identifiers in VoIP calls (e.g., user A may mention in a VoIP call about his identifier honete@gmail.com) and images (e.g., user A may save his identifier honete@gmail.com into an image hone.jpg to avoid detection by keywords mining techniques) using image-to-text and speech-to-text conversion techniques.

More details of a method used by the identity retrieval engine (116) are described in reference to FIG. 2B below.

In one or more embodiments of the invention, the association retrieval engine (117) extracts the network of individuals associated to the target (102a) based on relationships, topical similarity and spatial similarity as previously described with respect to "Target Association." Generally speaking, the association retrieval engine (117) identifies multiple different types of connections (or associations) between targets, such as relationships, keyword/topics, locality, etc. For example, the association retrieval engine (117) receives a set of targets (e.g., in the form of Target ID (212) for accessing and analyzing information relating to the targets stored in the repository (130) as described in reference to FIG. 1B below) and represents them as a graph, e.g., targets are represented as nodes with a set of weights between such nodes. In one or more embodiments, the association retrieval engine (117) analyzes the input targets and provides an association graph among the targets.

In one or more embodiments, the association retrieval engine (117) searches for the existence of any explicit or implicit transactions between two targets when asked to search for relationships among targets. As described above, two targets A and B are said to be related via an explicit relationship either if a direct Internet transaction is observed (e.g., an email/MMS exchanged between A and B, a VoIP call place between A and B, etc.) or if their relationship is explicitly declared and thus retrievable (e.g., A declares B to be one of his contacts in his Gmail, Hotmail, etc. account, A declares B as a friend in his Facebook account, or A declares B to be one of his connections in his LinkedIn account, etc.). Conversely, A and B are said to be implicitly related to each other when the association is made through a third party (e.g., a site, or individual). For example, A and B are implicitly associated if both post comments on the same blog, read news on the same news site, or share a common connection.

When asked to search for keyword/topical associations, in one or more embodiments, the association retrieval engine (117) searches for the existence of any explicit or implicit transactions between two targets focusing on connecting targets (either explicitly or implicitly) who may be involved in transactions using the same keyword(s) or topic(s). The keyword(s) and topic(s) of a transaction are provided by the content retrieval engine (118) that searches, e.g., from a text-based transactions as an input, for the existence of a keyword or set of keywords and/or extracts the topic being discussed. As a consequence, if target A is found to write a blog in which the keyword "chemical(s)" appear and target B is found to have sent out a MMS to somebody else in which the keyword "chemical(s)" is mentioned, the two targets A and B are linked together in the final graph. Same holds true in case A and B do not use the same keyword(s) but are involved or show interest around similar topics, i.e., "motorcycle racing". More details of a method used by the association retrieval engine (117) are described in reference to FIG. 2 below.

In one or more embodiments of the invention, the content retrieval engine (118) extracts and track topics embedded in Internet transactions associated to the target (102a). In one or more embodiments, the content retrieval engine (118) receives a piece of text and generates a set of semantic tags. A semantic tag can be of two types. When asked to operate a keyword search, the content retrieval engine (118) searches in the body of the text for the existence of keyword(s) being provided as an input to the engine. For each keyword found, it outputs the semantic tag of the format <keyword:occurrence>, while "keyword" describes the specific keyword being found and "occurrence" denotes the number of times it appears in the text. When asked to extract the topic of a text-based document, the content retrieval engine (118) provides a semantic tag of the format <topic:keywords> as an output, while "topic" describes the topic being extracted and "keywords" represent the most frequently used keywords in the text. In one or more embodiments, the content retrieval engine (118) receives voice and images and generates, with the use of speech-to-text and image-to-text converters, a set of semantic tags. As a consequence, any voice call intercepted by the target processor (140) is converted into text and then being processed by the content retrieval engine (118). This enables the user of the target processor (140) to automatically search for keywords and categorize voice calls based on the topics being discussed. Similarly, any image being captured by the target processor (140) is converted into text (e.g., using optical recognition (OCR) techniques) and processed by the content retrieval engine (118).

FIG. 1C show example detail of the identify attribution engine (119). Generally speaking, the identify attribution engine (119) reveals the true identity of the living persona behind an identifier for which a full data session is provided. In one or more embodiments of the invention, the identity attribution retrieval engine (119) includes the speech-to-text converter (252a), the image-to-text converter (252b), the speaker identification module (253a), the authorship identification module (253b), and the image identification module (253c). In one or more embodiments, the identity attribution retrieval engine (119) is configured to create additional biometric identifiers associated with the incoming data (e.g., speech data (251a), text data (251b), and image data (251c)) in order to establish or correlate the identity of the human being behind an electronic ID. That is to say the identity attribution retrieval engine (119) is configured to address the problem of attribution. Examples of attribution identity retrieval modules are speaker recognition (audio), authorship recognition (text), and facial recognition (image).

In one or more embodiments of the invention, the speaker recognition technique described in U.S. application Ser. No. 12/563,784 filed Aug. 6, 2009 and entitled "Hierarchical Real-time Speaker Recognition for Biometric VOIP Verification and Targeting" may be used in the speaker identification module (253a). For example, when a VoIP session is intercepted, the speaker's audio is compared against a database of known speakers in order to determine which person is behind the audio call.

In one or more embodiments of the invention, the authorship identification module (253b) examines text and outputs an identification of the person having likely written the text. In one or more embodiments, the authorship identification module (253b) refines and increases the confidence level of findings for short-text messages (i.e., email, MMS, tweets, chat messages, etc.) using authorship refinement technique, which receives as inputs other identifiers, network of associates, and location information of the individual whose identifier appears in the text message being processed. By leveraging such information and chaining several other text-based messages being written by the same individual, common ambiguity around the author of a short-text document may be resolved. In one or more embodiments, the authorship identification module (253b) is applied to voice data (251) and image data (251c) using the speech-to-text converter (252a) and the image-to-text converter (252b). For example, in the case of speech data (251a), the analysis of the way the speaker is talking can validate even further the outcome conclusion of the speaker identification module (253a). Similarly, by converting image data (251c) to text format and then calling the authorship identification module (253b), the same analysis may apply to suspects who avoid any form of text-based transactions by saving the messages or documents as images. From time to time, this biometric identifier acts as a hint to both other retrieval engines (116, 117, 118, and 120) and the alert engine (143). If, for example, a VoIP phone number was previously unknown, the biometric ID of the caller allows to associate the VoIP phone number with the speaker. In the case where the VoIP phone number is known, speaker recognition either confirms the speaker's true identity or indicates a situation where two individuals are sharing the same VoIP phone number. These are important steps towards attribution, i.e. associating electronic accounts with actual people behind them.

Generally speaking, the location retrieval engine (120) identifies other targets previously entered into the database (131, 132) with similar cyber and physical presence. In one or more embodiments of the invention, the location retrieval engine (120) discovers the temporal-spatial sequence of events associated to the target (102a). When the location retrieval engine (120) receives the sequence of HTTP sessions about the target (102A), it automatically extracts the <time,cyber-tags> of the target (102a), i.e., the websites visited by the target at specific times of the day. This information turns to be very useful to discover targets who tend to visit similar websites at similar times, common for individuals who tend to retrieve information by knowing the "when" and "where" information will be available for them. The location retrieval engine (120) will then compare these temporal (i.e., the "when") and spatial (i.e., the "where") sequences pair wise among all targets available and score each pair with a similarity metric. This information is then provided to a cyber-locality module (not shown) of the association retrieval engine (117), which will output the cyber-locality associate graph. When the location retrieval engine (120) receives RADIUS/RADA or GPS or MMS information about the target (102a), it will enable a geo-location extraction module (not shown) to retrieve the geographical location of the target (102a). When GPS information is provided about the target (102a) at a specific point in time, the location retrieval engine (120) outputs the <time,geo-tag>. When the target processor (140) intercepts specific types of MMS from the target (102a) containing GPS information in clear-text (e.g., when the target (102a) sends updates to social networking sites, such as MySpace, Facebook, Twitter, YouTube, etc., or when the target (102a) launches GPS-based applications, such as Windows LiveSearch, LocateMe, etc.), the location retrieval engine (120) parses the MMS, extracts the GPS coordinates, and creates a similar tag. When the location retrieval engine (120) receives RADIUS/RADA data for the target (102a), it parses the data to retrieve the Base Station ID that is serving the target (102a) at a specific point in time. It outputs its findings in the form of <timem,BS-ID>. In case the user of the target processor (140) is aware of the geographical location of such Base Station, then the target (102a) is traced. In case the user of the target processor (140) is not aware of the geographical location of such Base Station, the location retrieval engine (120) calls a BS ID location module to locate the Base Station. For example, the BS ID location module monitors all transactions of users served by the same base station ID (e.g., provided by the RADIUS/RADA records) and either waits to see one of these users starting a GPS-based transaction (as described as before) or more coarsely analyzes the HTTP Search queries executed by the cloud of users. In case the number of searches from the cloud about a specific zip-code or city is above a certain threshold, then heuristically tags the base station at the same zip code or city and consequently the target (102a) under scrutiny.

In one or more embodiments, the location retrieval engine (120) receives a set of targets as an input and determines for each pair of targets a link weight reflecting the strength of similarity in the sequence of events associated to the two targets. For example, the location retrieval engine (120) receives as an input the sequence of events in the format <time,spatial-tag> for each target and extract a pair-wise similarity metric between these sequences. When two targets have a strong similarity in the sequence of events, they are connected with a weight close to 1, with 1 indicating maximum level of similarity or the exact same sequence. When two targets have a very weak similarity in the sequence of events, they are connected with a weight close to 0, with 0 indicating maximum level of dissimilarity or completely different sequences. Associations for which the spatial-tags refer to cyber locations (i.e., <time,websites>) are referred to as type cyber-tags. Associations for which the spatial-tags refer to geographical locations (i.e., places where the individuals have been located, <time,geographical-locations>) are referred to as type geo-tags. In one or more embodiments, the location retrieval engine (120) uses Euclidean distance over the two sequences as a similarity metric for two sequences. In one or more embodiments, more complicated similarity metrics may also be used.

In one or more embodiments of the invention, the information discovered by the data analysis engine (142), as described above, is then provided as an input to the alert engine (143) that generates alerts according to rules predefined by the user of the target processor (140). In other words, a positive hit occurs if the target (102a) is deemed suspicious based on user-configured rules to define suspicious characteristics. Generally speaking, the target processor (140) will alert based on (i) identity mismatch rule, (ii) blacklisted relational rule, (iii) blacklisted content rule, and (iv) blacklisted communication rule.

In one or more embodiments of the invention, the alert engine (143) includes content rule alert engine (121), identity mismatch rule alert engine (122), relationship rule alert engine (123), and communication rule alert engine (124).

In one or more embodiments, the content rule alert engine (121) is configured to identify the occurrence of blacklisted keywords or topics and then to label the corresponding relationship link and generate the appropriate alert. In one or more embodiments, the content rule alert engine (121) searches for keywords to match a blacklist of keywords which is configured by the user of the target processor (140), or a separate blacklist of topics. The distinction here is that keywords appear directly in the text as found in a data session and the topics are terms generated by additional analysis and are passed as meta-data with the original data. Each unique keyword or topic that is matched generates a separate graph label and alert.

In one or more embodiments, the identity mismatch rule alert engine (122) is configure to find profile attribute fields that are inconsistent across profiles associated with the same person. For example, if the name or age on Facebook and blogger did not match up, an identity mismatch alert occurs. Configuration pages will allow the user of the target processor (140) to specify which fields to use to generate a mismatch alert. Example fields include age, date of birth, name, gender, location, etc. Configuration also allows a tolerance to be considered, so as not to trigger if, for example, ages of 47 and 48 are found. For each new profile field, the identity mismatch rule alert engine (122) retrieves all prior entries of the same field and performs the comparisons.

In one or more embodiments, the relationship rule alert engine (123) is configured to determine if a target's new association hints link that target to any other person in the target list, i.e. the list entered by the LEA. The input of relationship rule alert engine (123) is the hints from the association retrieval engine (117). For example, the relationship rule alert engine (123) loads data from the lists of associates in the databases (131, 132) to determine if the newly found associations lead to a connection to one of other existing targeted persons. Configuration may be set to determine if the association retrieval engine (117) looks zero, one, or two hops away for a relationship. For operation scalability of the target processor (140), longer paths are handled on-demand via the user interface (126). If the hop length is zero or one, the relationship rule alert engine (123) examines the new links generated by the association retrieval engine (117) and generates an alert if any of those links have a target as endpoint. For the 2-hop case, the relationship rule alert engine (123) collects the endpoints of all new links and retrieve from the databases (131, 132) all links with those endpoints, and then search for targets amongst this larger set of targets. The output of the relationship rule alert engine (123) is an alert along with the matched target IDs and the list of paths that connect those targets.

In one or more embodiments, the communication rule alert engine (124) is configured to examine the session for violations of communication patterns. In one or more embodiments, the communication rule alert engine (124) uses a blacklist of networks (e.g., IP subnets, VoIP phone numbers, domains, etc.) that can incorporate "and/or" conditions and "source/destination" restrictions, allowing for a robust rule creation. The output of the communication rule alert engine (124) populates an entry in an alert table, gives the target ID, and pointer to the offending session, i.e. which rule was broken. Some alerts, such as calling a blacklisted phone number, may potentially generate two different alerts including the callee.

In one or more embodiments of the invention, the user interface (126) provides a graphical interface through which the user of the target processor (140) can (i) insert new suspects (e.g., 102a) and associated targeting criteria, (ii) navigate and consume the large amount of information being retrieved and linked together by the target processor (140), (iii) access alarming facts about the suspect (102a) according to the defined rules, and (iv) export a comprehensive and detailed report constituting the suspect case file with all positive hints found by the target processor (140). Furthermore, the user interface (126) provides the user of the target processor (140) with a simple but powerful query language using which the user of the target processor (140) can pull information stored in the two databases (131, 132) and construct queries as desired. In one or more embodiments, the user interface (126) is composed by four main pages described using the example depicted in FIGS. 3A-3D below.

FIG. 1B shows details of the primary database (131) in the repository (130) of the system (100). As noted above, the secondary database (132) includes essentially the same data structure components (i.e., database schema) of the primary database (131). As shown in FIG. 1B, the primary database (131) includes target configuration (210), target profile (220), target data (230), and target hints (240). In one or more embodiments of the invention, each of these components of the primary database (131) includes multiple entries (e.g., entry (211), entry (221), entry (231), entry (241), etc.) each corresponding to a particular target identified by a tag field referred to as target ID, which is a unique identifier created for each target investigated by the target processor (140). For example, information regarding the target (102a) may be stored collectively in entry (211), entry (221), entry (231), and entry (241) each tagged with the target ID (212) representing the target (102a). In one or more embodiments, the target ID (212) may be used by data population engine (141) and data analysis engine (142) to populate and retrieve information relating to the target (102a) stored in the repository (130) to perform various configured functions.

In one or more embodiments of the invention, the target configuration (210) is configured to store the targeting criteria and alerting criteria. The targeting criteria include a set of rules based on which the target processor (140) collects data (e.g., from the public web and IP traffic) about a suspect (e.g., target (102a)). The alerting criteria include a set of rules based on which the target processor (140) generates positive hits about a suspect (e.g., target (102a)).

For example, the targeting criteria may be stored using two main tables named target record (212) and target policy (213) while the alerting criteria may be stored using one main table named target alert rule (214).

In one or more embodiments, the target record (212) is configured to store initial (e.g., seed) information about a new target (e.g., target (102a)) when it is entered into the repository (130) for the target processor (140) to collect information. For example, seed information provided by the user of the target processor (140) to start data collection about the target (102a) may be stored in the target record (212). In one or more embodiments, the target record (212) includes (i) the target-name (e.g., name of the target (102a) as initially known and entered by the user of the target processor (140)), (ii) the list of initially known identifiers used by the target (102a) to access various services in the communication network (101), (iii) the status of the target (102a) such as "created-at, deleted-at, expired-at or active" that describe the suspect record has been created and added into the system, deleted from the system, still in the system but expired, or still active, and (iv) the source of target (102a) such as "user-added" indicating that the target (102a) has been added manually by the user of the target processor (140) or "auto-added" indicating that the target (102a) is automatically added by the target processor (104). An example portion of the target record (212) is shown in Table 1 below.

TABLE 1

| Field Name | Type | Description |
| --- | --- | --- |
| id | int | unique identifier for the table enties |
| target_id | int | unique id for each target entered by the user |
| target_name | string | user assigned name for the target |
| identifier_id | int | foreign key to the identifier table |
| value | string | value of the target (email, phone number, etc.) |
| policy_id | int | foreign key to the policy table |
| alert_rules_id | int | foreign key to the alert rules table |
| created_at | timestamp | time at which target was created |
| deleted_at | timestamp | time at which target was deleted |
| expired_at | timestamp | time at which policy for the target expired |
| active | boolean | indicates if the target is currently active or not |
| user_added | boolean | indicates if the target was added by the user or hone |

In one or more embodiments, the target record (212) links to the target policy (213) and the target alert rule (214) through the fields named policy-id and alert-rules-id, respectively. In one or more embodiments, the target policy (213) stores the details of the policy that describes the "where" and "what" to search for about the target (102a). For example, the "where" may be represented by a list of public websites (such as Yellow Pages, White Pages, Blogger.com, Xanga.com, ABCnews.com, LiveJournal.com, etc.), private websites (such as MySpace.com, Twitter.com, Facebook.com), and Internet services (such as Gmail, Yahoo email, SMTP/POP3/IMAP email, MSN, MMS, VoIP, etc.) that the user of the target processor (140) specified for the target processor (140) to focus the search on. In addition, the "what" may be represented by a list of keywords (such as fertilizers, explosive, nuclear, bombs, chemicals, etc.) and entities (such as calls with any Chinese phone numbers identified by country code +86*, or browsing of any North Korean websites identified by *.korea.net, etc.) specified for the target processor (140) to focus the search on.

In one or more embodiments, the target alert rule (214) tracks the different rules the user of target processor (140) is interested in receiving alert about the target (102a). In one example, the identity mismatch rules may be specified here so that an alert may be generated when mismatches are found about the target (102a) as having different names, e.g., Hon Te on Blogger.com becoming Mark Brown on MySpace.com. In another example, age may be specified here so that an alert may be generated when mismatches are found about the target (102a) as having different ages, e.g., a 15-year old on Xanga.com becoming 50 years old on Facebook.com. In yet another example, residence may be specified here so that an alert may be generated when mismatches are found about the target (102a) as having different residence addresses, e.g., San Jose, Calif., USA on LiveJournal.com becoming Phoenix, Ariz., USA on Twitter.com, etc. In addition, the target alert rule (214) may also specify association/relational rules including implicit or explicit linkages with individuals previously entered as targets for the target processor (140). In one example, an alert may be generated when Hone Te—now Mark Brown—sends an email to John Smith—previously entered as a target, or when Hone Te—now Mark Brown—receives an email from 144532783 @yahoo.com, whose numeric handle 144532783 has been active on the news site ABCnews.com where John Smith has been located.

In one or more embodiments, the target profile (220) includes a set of tables used to store the up-to-date profile retrieved about the target (102a). In one or more embodiments, the target profile (220) includes (i) the list of identifiers (222) associated to the target (102a) such as phone number(s), email address(es), instant messaging ID(es), etc., (ii) the list of attributes (223) associated to the target (102a) such as age, residence address, working address, interests, etc., (iii) the list of associates (224) of the target (102a), i.e., individuals who are linked to the suspect because of the existence of an implicit or explicit relational, topical, and/or spatial associations, and (iv) the list of cyber and physical locations (225) where the target (102a) has been traced.

In one or more embodiments, the target data (230) includes a set of tables (e.g., email data (232), web page data (233), etc.) capturing both the raw information about data sessions in which the target (102a) was involved and the associated time and physical location where such sessions took place. Specifically, different tables are used for each data service as each of them requires a different level of details. An example portion of the email data (232) for an email data session is shown in TABLE 2 below without the rows associated to the sender's and recipient(s)' physical locations. In the example, the email data (232) includes fields pointing to (i) the time where the session started (i.e., time field), (ii) the "from, to, cc, bcc" of the session (i.e., from, to, cc-to, bcc-to fields), (iii) the body of the email (i.e., body field), (iv) the source IP address of both the sender and the SMTP server (i.e., ip-address, smtp-ip-address fields), and (v) the list of blacklisted keywords found in the body of the email (i.e., keywords field). Additional fields not shown in the example depicted in TABLE 2 may include (vi) tags for blacklisted entities (i.e., whether the sender or any of the recipient(s) match the blacklisted entities defined for the target), (vii) the subject of the email, (viii) the list of attachment(s), and (ix) the list of blacklisted keywords found in the attachment(s). Similar tables are designed for HTML webpages (blogs, news sites, social networking, etc.), VoIP calls, IM, Chat, MMS, etc.

TABLE 2

| Field Name | Type | Description |
|---|---|---|
| id | int | unique id for the entries in this table |
| time | timestamp | time when this data was found |
| from | string | id of the person who sent the email |
| to | text | id of the person/s who received the email |
| cc_to | text | id of the person/s who we cc'ed on the email |
| bcc_to | text | id of the person/s who we bcc'ed on the email |
| body | text | body of the email |
| ip_address | string | ip_address of the sender |
| smtp_ip_address | string | ip_address of the smtp server |
| keywords | text | keywords extracted from the email |

In one or more embodiments, the target hints (240) includes a set of tables storing (i) all hints (242) found about the target (102a) during its search according to the logic coded into the data analysis engine (142) and (ii) the set of positive hits (243) being generated by the alert engine (143) according to the rules being enabled in the target alert rule (214). For example, one row of this table may point to a spatial association between Hone Te and Jim Stern highlighting that the two individuals were in the same physical location at the same time, but with no positive hit tag attached as Jim Stern was never entered into the repository (130) as a target. Conversely, a relational association hint between Hone Te and John Smith may be tagged as a positive hit as John Smith was previously entered into the repository (130) as a target.

Figure 2A:
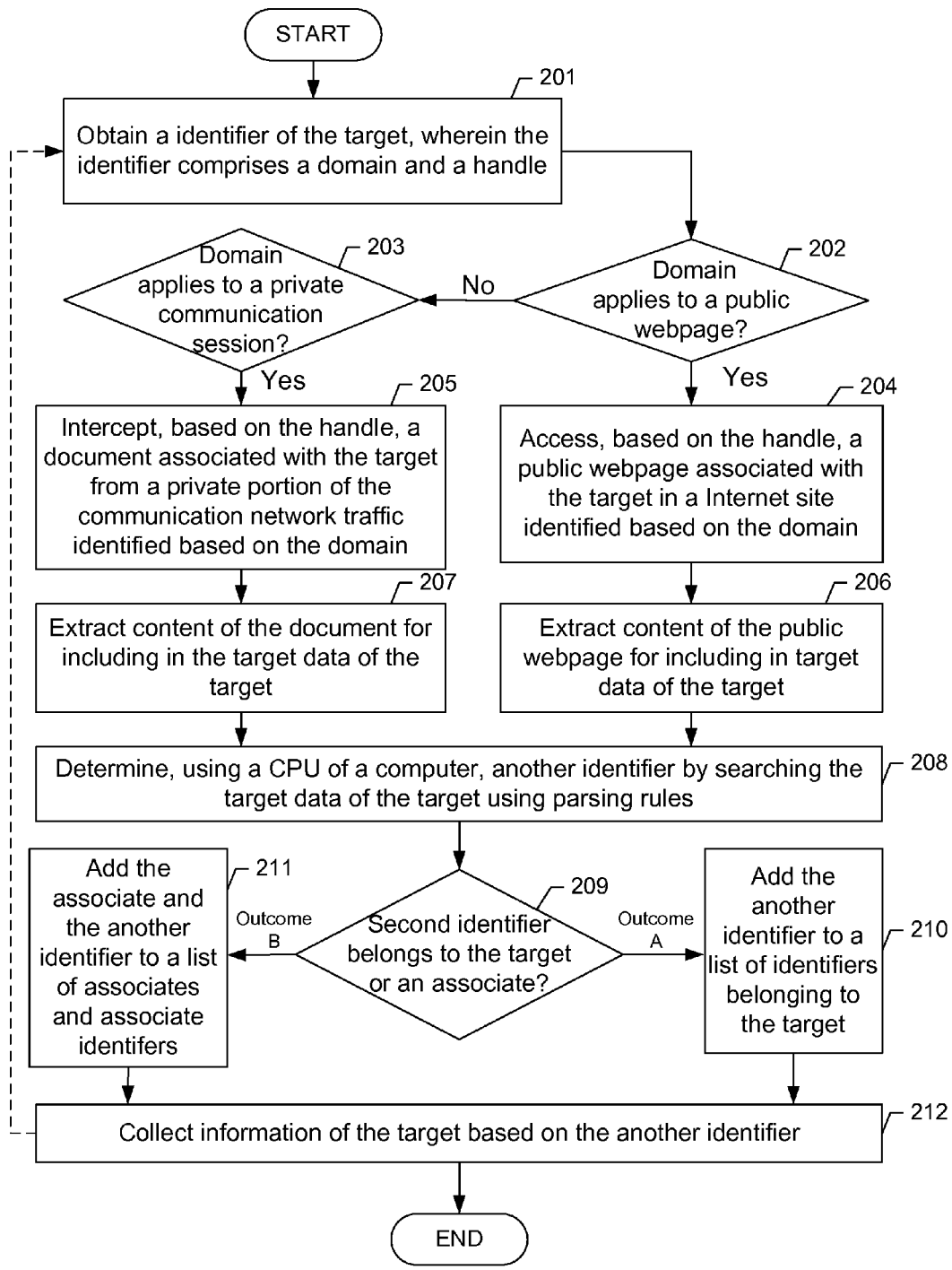
FIGS. 2A and 2B show a flowchart of a method according to aspects of the invention.
Figure 2B:
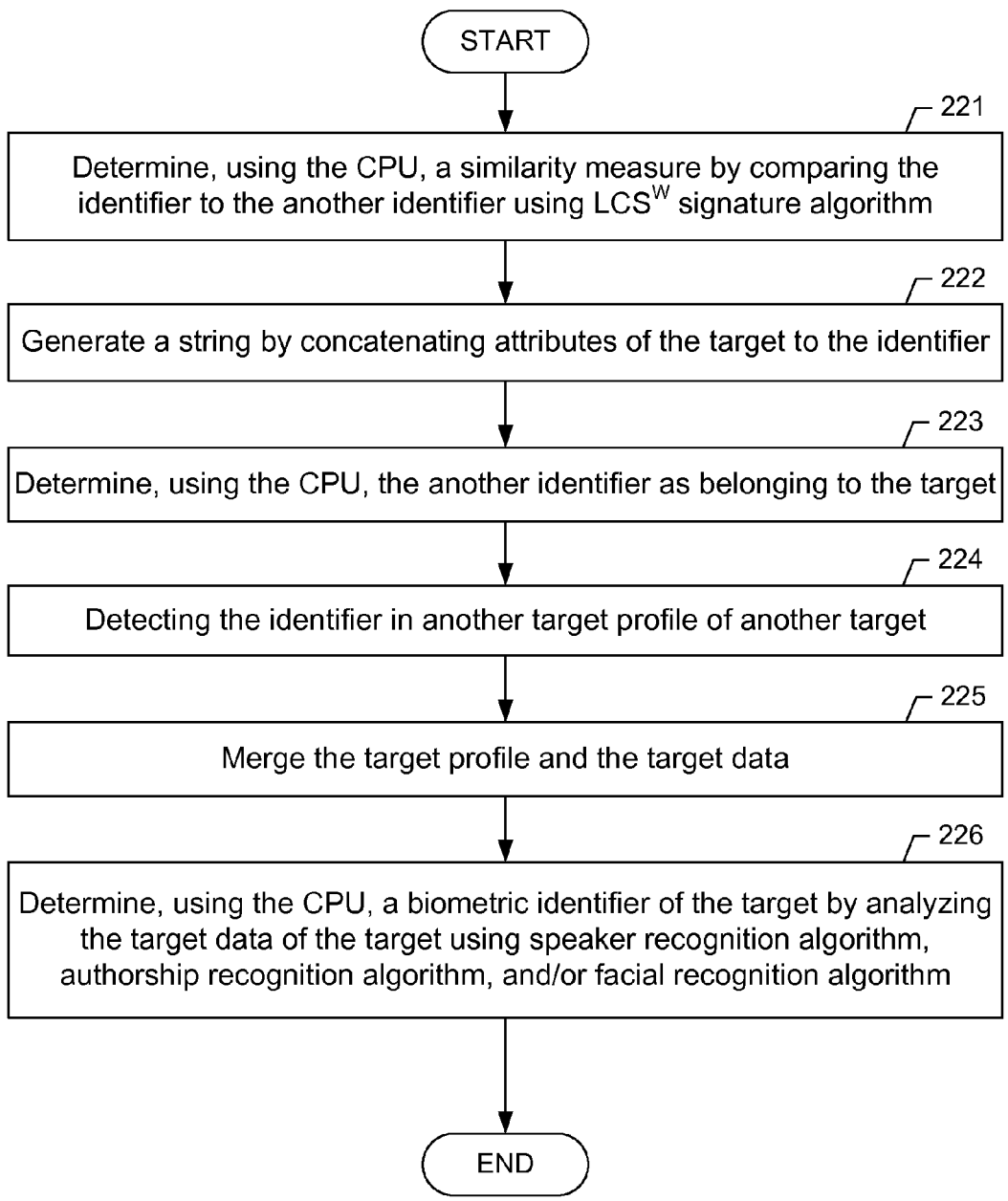

FIGS. 2A and 2B depict a flowchart of a method in accordance with one or more embodiments of the invention. In one or more embodiments of the invention, one or more of the steps shown in FIGS. 2A and 2B may be omitted, repeated, and/or performed in a different order. Accordingly, embodiments of the invention should not be considered limited to the specific arrangements of steps shown in FIGS. 2A and 2B. In one or more embodiments of the invention, the method depicted in FIGS. 2A and 2B may be practiced using system (100) described with respect to FIG. 1A above.

FIGS. 2A and 2B depict a method of collecting information of a user using a communication network. For example, the user may be the target (102a) depicted in FIG. 1A that is either specified by a user of the target processor (140) in target development mode or automatically determined by the target processor (140) in target acquisition mode. Initially in Step 201 of FIG. 2A, an identifier of the target is obtained, including a domain and handle. Various examples of the identifier are described in reference to FIG. 1A above. The identifier is then determined to be whether applicable to a public webpage (Step 202) or a private communication session (e.g., IP session, telephone conversation session, etc.) (Step 203).

Based on such determination, in Step 204, a public webpage associated with the target is accesses, based on the handle in an Internet site identified based on the domain. Accordingly, content of the public webpage is then extracted for including in target data of the target (Step 206). As described above in reference to FIG. 1A, various portions of the target data are associated with respective parsing rules each pre-determined based on a source (e.g., a particular website) of the respective portion of the target data. For example, the content of the accessed public webpage is extracted using a particular parsing rule associated with the particular Internet site.

In Step 208, another identifier is determined, using a CPU of a computer, by searching the target data of the target using various applicable parsing rules.

In Step 209, the second identifier is associated with the target with a determination whether this another identifier belongs to the target or belongs to an associate of the target. A method of such determination using a pre-determined criterion is described in reference to FIG. 2B below.

In one outcome of such determination, the another identifier is added to a list of identifiers belonging to the target (Step 210). In another outcome of such determination, the another identifier is added to a list of identifiers belonging to associates of the target (Step 211). For example, such lists may be stored in the identifiers (222) in the target profile (220) described in FIG. 1B above. In addition, a user using the another identifier may be determined to be a new associate of the target and added to the associates (224) in the target profile (220).

In one or more embodiments, the another identifier is determined as belonging to an associate of the target by analyzing the target data of the target based on a set of association rules, such as a relational association rule, a topical association rule, and a spatial association rule as described in reference to FIG. 1A above.

In Step 212, information about the target is collected based on the another identifier, for example via the same process depicted in the above described steps as indicated by the dashed arrow in FIG. 2A. In the case if the another identifier belongs to an associate of the initially provided identifier, the iterative loops through the dashed arrow represent further searching target data of various associates in an associate list of the target for including in the target data of the target. As described above, number of hops can be determined by the user of the method for such expanded search through a network of associates starting from an initially given target.

Moreover, information about the target may also be collected based on the another identifier via additional steps described below.

Returning to Step 203, in the case if the initially obtained identifier applies to a private communication session, a document (e.g., text, speech, image, etc.) of an email, telephone or VoIP phone conversation, scanned or converted image, etc.) associated with the target is then intercepted, e.g., from a private portion of communication network traffic identified based on the domain of the identifier (Step 205). Various data sniffing scenarios are as described in reference to FIG. 1A above.

In Step 207, content of the intercepted document is extracted for including in the target data of the target. Similar to the discussion of Step 206 above, the content of the document is extracted using a parsing rule particular to the source of the intercepted document (e.g., the email link, telephone or VoIP phone data formats, particular image format, etc.). Accordingly, the extracted content is used as part of the target data of the target in the Steps 208 through 212 described above.

As described in reference to FIGS. 1A through 1C above, identifier can be determined from email address, webpage login name, chat user name, social networking user name, telephone number, voice over IP (VoIP) phone number, etc. Further, domain is determined explicitly when determined from the email address, and is determined implicitly when determined from webpage login name, chat user name, social networking user name, telephone number, and VoIP phone number, etc.

FIG. 2B describes detail steps of the Step 209 of FIG. 1A. Initially in Step 221, a similarity measure (e.g., a number between 0 and 1 representing a range from no similarity to identical) is determined using a CPU by comparing the identifier to the another identifier using Longest Common Subsequence Windowed ($LCS^W$) signature algorithm. More details of the $LCS^W$ signature algorithm can be found in U.S. patent application Ser. No. 12/505,463 filed Jul. 17, 2009 entitled "System and Method for Identifying Network Applications Based on Packet Content Signatures". In one or more embodiments of the invention, an outcome of the pre-determined criterion in Step 209 of FIG. 2A, leading to the determination that the another identifier belongs to the same target as the initially provided identifier, is determined in response to the similarity measure exceeding a pre-determined threshold (e.g., 0.5, 0.7, 0.9, etc.) (Step 223).

As described above, attributes (e.g., from attributes (223) in the target profile (220) of the initially provided target) may be included for determining similarities of two identifiers. In Step 222, a string is generated by concatenating various attributes (e.g., address, birthday, etc.) of the target to the initially provided identifier of the target, for example before the similarity measure is determined in Step 221. In one or more embodiments of the invention, an alpha-text string and a numerical string are generated from the string such that an alpha-text portion of the another identifier is compared to the alpha-text string using the LCSW signature algorithm while a numerical portion of the another identifier is compared separately to the numerical string using the LCSW signature algorithm.

In Step 224, an identifier (e.g., the initially provide identifier or the another identifier determined to belong to the same target) of the target is detected in another target profile of another target who is another user of the communication network. In particular, the identifier detected in the another target profile indicates that the another user also uses this identifier in the communication network, for example as email address, login name, telephone number, or other handles to access resources in the communication network.

Accordingly, the target profile of the target is merged with the another target profile and the target data of the target is merged with target data of the another target (Step 225).

In Step 226, a biometric identifier of the target is determined by analyzing the target data associated with the identifiers using speaker recognition algorithm, authorship recognition algorithm, or facial recognition algorithm as additional confirmation whether the initially provide identifier and the another identifier indeed points to the same person.

The method described in reference to FIGS. 2A and 2B can illustrated using the application use case described below detailing the algorithm for identifiers retrieval, i.e. the problem of finding new identifiers associated to a target. Example identifiers include email addresses, chat usernames, social networking accounts, or VoIP phone numbers. Identifier retrieval consists of two subproblems; first, we must identify what amongst the incoming data corresponds to an identifier, and secondly, we must decide if that identifier is likely to belong to a known target.

The first stage of the algorithm is to determine which text or fields in a private IP session or public webpage correspond to an identifier. For social networking websites, such as Facebook and blogger, profile fields allow users to list their identifiers. For example, Facebook profiles optionally contain fields for "Skype", "AIM", or "Mobile Number" contact information. In these cases, we create a set of keywords that correspond to the domain of a keyword, such that the "Google Talk" field on one profile and the "GTalk" field on a different site both correspond to user names on the same domain. These sets of keywords representing domain descriptions are pre-configured for the known targetable domains.

Alternatively, identifiers can appear in plain text. Consider the example of a person speaking their email address over a VoIP call, where the target processor (140) using a speech-to-text engine to transcribe the spoken words. We identify these email addresses through regular expressions that search for "at", "@", "dot", and "com". Regular expressions are also used to identify the patterns of numbers representing a phone number, i.e., "1-800-123-4567".

The second phase of the identifiers retrieval problem is to decide if a given identifier is associated to a known target or not. We consider three potential cases. The first case is exact matching, where both the handle and domain match a known identifier of a target. The second case is referred to as perfect handle matching, where just the handle matches exactly the handle of another identifier belonging to a target. As an example, consider a target with email address "mustanglover@yahoo.com". If an MSN chat session is then found with username "mustanglover", the MSN username is associated to the yahoo email account using the perfect handle matching criteria. In contrast, the exact matching case only occur if the user had previously listed the mustanglover MSN account on one of their profiles.

The third matching case is partial matching, where the handle is similar to the existing information known about a target. The main idea behind our algorithm for this matching is to use the longest common substring (LCS) with sliding window matching algorithm to score the similarity between the unknown identifier and each target. We then set a threshold for similarity, and if a new identifier exceeds this threshold, then we associate that new identifier with the target. Intuitively, the longest common substring returns the string that is similar between the unknown identifier and the target's known identifier, and the longer the returned string, the more similar are the two identifiers. Consider the example of the target John Smith with identifier john.smith@gmail.com and a newly found identifier jsmith@yahoo.com. The domains do not match, so we only consider the handles, and find the longest common substring as "jsmith" (only "ohn." does not match).

In practice, a target will have multiple different handles and usernames, of different forms, including text and numbers. For example, often users include numbers after their handles (especially in case of common names), so John Smith might actually use jsmith80@gmail.com, where the number 80 corresponds to his birth year, 1980. We separate the text and numeric sections of an unknown identifier in order to compare them separately. Then, instead of comparing to each known identifier of a target, we concatenate all of a target's information into a string for use as input to the $LCS^W$ algorithm: string S_A containing all text information and S_N containing all numerical information. As personal information such as names often occur in a handle, we also concatenate available profile information about the target, including full name, street address, company, and hobbies. Ultimately, we create two strings, one with letters S_A and one with numbers S_N, and perform two $LCS^W$ matches and combine their scores. An example S_A string is "johnsmithmainstreetrunning" and S_N string is "19802566" where 1980 is John's birth year and "2566" is the numerical part of his home address.

We next address how the scoring mechanism works to give an indication of the likelihood of an identifier belonging to a target. We first calculate what percentage of the characters in the new identifier match with the target's S_A and S_N strings. In the jsmith example, all 6 characters matched the target S_A string. We give additional scoring points to contiguous matches, i.e. 5 of 6 characters in jsmith appear together in the S_A string. Finally, we include a weight function that favors longer matches over short matches. Intuitively, the identifier j2@yahoo.com would match 100% of characters with John Smith's profile, though there is a good probability that the identifier belongs to someone else. After scoring is completed, we compare against a threshold to determine if the new identifier belongs to the target, where the threshold's value is pre-determined through off-line performance tuning.

Although specific formats, structures, or partitions are used as examples in the foregoing description regarding the various components in the data population engine, the data analysis engine, the alert engine, the target configuration, the target profile, the target data, the target hints, etc., one skilled in the art, with the benefit of this disclosure, will recognize that other formats or structures may also be used in the system, methods, and examples described without deviating from the spirit of the invention.

Figure 3:
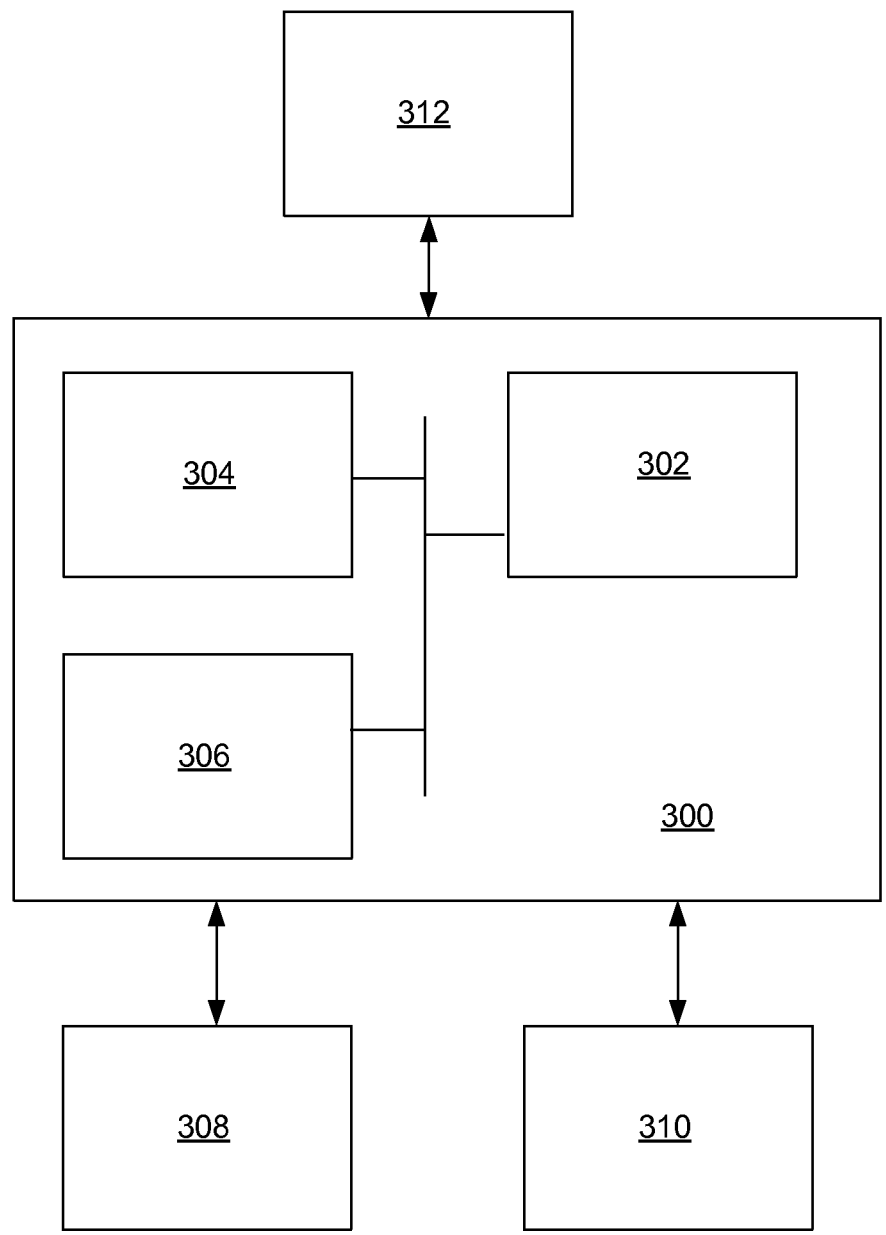
FIG. 3 shows a computer system according to aspects of the invention.

Embodiments of the invention may be implemented on virtually any type of computer regardless of the platform being used. For example, as shown in FIG. 3, a computer system (300) includes one or more processor(s) (302) (e.g., central processing unit or CPU), associated memory (304) (e.g., random document access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's computers (not shown). The computer (300) may also include input means, such as a keyboard (308), a mouse (310), or a microphone (not shown). Further, the computer (300) may include output means, such as a monitor (312) (e.g., a liquid crystal display (LCD), a plasma display, or cathode ray tube (CRT) monitor) for example to display various results such as the feature vectors, the principal components, the application space, the signatures, etc. The computer system (300) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (300) includes at least the minimal processing, input, and/or output means necessary to practice embodiments of the invention.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for collecting and processing information of a target comprising a user of a communication network, comprising:
   obtaining a first identifier of the target, wherein the first identifier comprises a first domain and a first handle;
   identifying a first Internet site based on the first domain;
   accessing, in the first Internet site and based on the first handle, a first public webpage associated with the target;
   selecting a first parsing rule from a plurality of parsing rules that is associated with the first Internet site;
   extracting, by a central processing unit (CPU) of a computer, a second identifier from the first public webpage using the first parsing rule;
   determining, by the CPU and in response to extracting the second identifier, a similarity measure by comparing the second identifier to the first identifier using a pre-determined algorithm;
   determining, in response to the similarity measure exceeding a pre-determined threshold and without based on any prior association between the first identifier and the second identifier, that the first identifier and the second identifier identify the same person as the user of the communication network based on a pre-determined criterion; and
   collecting information of the target based on the second identifier for including in target data of the target.

2. The method of claim 1, further comprising:
   obtaining a third identifier of the target, wherein the third identifier comprises a third domain and a third handle;
   intercepting, based on the third handle, a document associated with the target from a private portion of communication network traffic identified based on the third domain; and
   extracting content of the document for including in the target data of the target, wherein the content of the document is extracted using a third parsing rule, of the plurality of parsing rules, associated with the private portion of the communication network traffic identified based on the third domain.

3. The method of claim 1,
   wherein the second identifier is determined from at least one selected from a group consisting of email address, webpage login name, chat user name, social networking user name, telephone number, and voice over IP (VoIP) phone number,
   wherein the second domain is determined explicitly when determined from the email address, and
   wherein the second domain is determined implicitly when determined from at least one selected from a group consisting of webpage login name, chat user name, social networking user name, telephone number, and VoIP phone number.

4. The method of claim 1, further comprising:
   adding the second identifier to a list of identifiers belonging to the target,
   wherein the second identifier comprises a second domain and a second handle.

5. The method of claim 4,
wherein the pre-determined algorithm comprises a Longest Common Subsequence Windowed ($LCS^W$) signature algorithm.

6. The method of claim 5, further comprising:
generating a string by concatenating a plurality of attributes of the target to the first identifier,
wherein the plurality of attributes of the target are stored in a target profile of the target,
wherein similarity measure is further determined by comparing the second identifier to the string using the $LCS^W$ signature algorithm, and
wherein the plurality of attributes of the target are determined based in part by searching the target data of the target using the plurality of parsing rules.

7. The method of claim 6, further comprising:
generating an alpha-text string and a numerical string from the string,
wherein the similarity measure is further determined by at least one selected from a group consisting of comparing a alpha-text portion of the second identifier to the alpha-text string using the $LCS^W$ signature algorithm and comparing a numerical portion of the second identifier to the numerical string using the $LCS^W$ signature algorithm.

8. The method of claim 4,
wherein the second identifier is found in a user profile portion of the first public webpage, and
wherein the user profile portion of the first public webpage is identified based on the first parsing rule associated with the first Internet site.

9. The method of claim 4, wherein collecting information of the target based on the second identifier comprises:
accessing, based on the second handle, a second public webpage in a second Internet site identified based on the second domain; and
extracting content of the second public webpage for including in the target data of the target, wherein the content of the second public webpage is extracted using a second parsing rule, of the plurality of parsing rules, associated with the second Internet site.

10. The method of claim 4, wherein collecting information of the target based on the second identifier comprises:
intercepting, based on the second handle, a document associated with the target from a private portion of the communication network traffic identified based on the second domain; and
extracting content of the document for including in the target data of the target, wherein the content of the document is extracted using a second parsing rule, of the plurality of parsing rules, associated with the private portion of the communication network traffic identified based on the second domain.

11. The method of claim 10, wherein the document comprises at least one selected from a group consisting of an email, a telephone recording, and a VoIP recording.

12. The method of claim 4, further comprising:
storing the second identifier in a target profile of the target;
detecting the second identifier in another target profile of another target comprising another user of the communication network by searching a plurality of target profiles of a plurality of targets comprising a plurality of users of the communication network;
merging the target profile of the target with the another target profile; and;
merging the target data of the target with target data of the another target.

13. The method of claim 11, further comprising:
determining, using the CPU, a biometric identifier of the target by analyzing the target data of the target using at least one selected from a group consisting of speaker recognition algorithm, authorship recognition algorithm, and facial recognition algorithm; and
determining an identity of the target based on the biometric identifier.

14. The method of claim 1, further comprising:
determining, using the CPU, the second identifier by further searching target data of a plurality of associates in an associate list of the target using the plurality of parsing rules.

15. The method of claim 1, further comprising:
determining a third identifier by searching the first public webpage using the first parsing rule, wherein the third identifier comprises a third domain and a third handle;
determining, using the CPU, the third identifier as belonging to an associate of the target, wherein the associate comprises another user of the communication network, wherein the third identifier is determined as belonging to the associate by applying a plurality of association rules to the target data of the target with respect to the another user;
adding the another user to a list of associates of the target; and
adding the third identifier to a list of identifiers belonging to associates of the target.

16. The method of claim 15, further comprising:
determining, using the CPU, at least one selected from a group consisting of relationships, topics, and localities by analyzing the target data of the target,
wherein the plurality of association rules comprise at least one selected from a group consisting of a relational association rule, a topical association rule, and a spatial association rule.

17. A non-transitory computer readable medium, embodying instructions when executed by the computer to collect and process information of a target comprising a user of a communication network, the instructions comprising functionality for:
obtaining a first identifier of the target, wherein the first identifier comprises a first domain and a first handle;
identifying a private portion of communication network traffic based on the first domain;
intercepting, from the private portion of communication network traffic and based on the first handle, a document associated with the target;
selecting a first parsing rule from a plurality of parsing rules that is associated with the private portion of the communication network traffic;
extracting a second identifier from the document using the first parsing rule;
determining, in response to extracting the second identifier, a similarity measure by comparing the second identifier to the first identifier using a pre-determined algorithm;
determining, in response to the similarity measure exceeding a pre-determined threshold and without based on any prior association between the first identifier and the second identifier, that the first identifier and the second identifier identify the same person as the user of the communication network based on a pre-determined criterion; and
collecting information of the target based on the second identifier.

18. The non-transitory computer readable medium of claim 17, the instructions when executed by the processor further comprising functionality for:

obtaining a third identifier of the target, wherein the third identifier comprises a third domain and a third handle;

accessing, based on the third handle, a public webpage associated with the target in a Internet site identified based on the third domain;

extracting content of the public webpage for including in the target data of the target, wherein the content of the public webpage is extracted using a third parsing rule, of the plurality of parsing rules, associated with the Internet site.

19. A system for collecting and processing information of a target comprising a user of a communication network, comprising:

a repository storing a target profile of the target and target data of the target, wherein the target profile comprises a list of identifiers associated with the target, wherein the list of identifiers associated with the target comprises a list of identifiers belonging to the target and a list of identifiers belonging to associates of the target;

a target data population engine comprising:
a web crawler configured to extract contents of Internet web pages based on the identifiers associated with the target for including in the target data of the target, wherein the contents of the Internet web pages are extracted using a plurality of parsing rules corresponding to the Internet web pages;

a target data analysis engine comprising:
an identifier retrieval engine configured to associate an identifier of the identifiers with the target as belonging to the target; and
an association retrieval engine configured to associate another identifier of the identifiers with the target as belonging to an associate of the target;

a processor; and memory storing instructions when executed by the processor comprising functionalities for:
obtaining a first identifier of the target, wherein the first identifier comprises a first domain and a first handle;
identifying a first Internet site based on the first domain;
accessing, in the first Internet site and based on the first handle, a first public webpage associated with the target;
selecting a first parsing rule from a plurality of parsing rules that is associated with the first Internet site;
extracting a second identifier from the first public webpage using the first parsing rule;
determining, in response to extracting the second identifier, a similarity measure by comparing the second identifier to the first identifier using a pre-determined algorithm;
determining, in response to the similarity measure exceeding a pre-determined threshold and without based on any prior association between the first identifier and the second identifier, that the first identifier and the second identifier identify the same person as the user of the communication network based on a pre-determined criterion; and
collecting information of the target based on the second identifier for including in target data of the target.

20. The system of claim 19,
wherein the target data population engine further comprises:
a IP sniffer configured to extract contents of documents intercepted from private portions of communication network traffic based on the identifiers associated with the target for including in the target data of the target, wherein the contents of the documents are extracted using a plurality of parsing rules corresponding to the private portions of the communication network traffic;

wherein the instructions when executed by the processor further comprises functionalities for:
obtaining a third identifier of the target, wherein the third identifier comprises a third domain and a third handle;
intercepting, based on the third handle, a document associated with the target from a private portion of the communication network traffic identified based on the third domain; and
extracting content of the document for including in the target data of the target, wherein the content of the document is extracted using a third parsing rule, of the plurality of parsing rules, associated with the private portion of the communication network traffic identified based on the third domain.

21. The system of claim 19,
wherein the second identifier is determined from at least one selected from a group consisting of email address, webpage login name, chat user name, social networking user name, telephone number, and voice over IP (VoIP) phone number,
wherein the second domain is determined explicitly when determined from the email address, and
wherein the second domain is determined implicitly when determined from at least one selected from a group consisting of webpage login name, chat user name, social networking user name, telephone number, and VoIP phone number.

22. The system of claim 19, wherein the instructions when executed by the processor further comprises functionalities for:
adding the second identifier to the list of identifiers belonging to the target,
wherein the second identifier comprises a second domain and a second handle.

23. The system of claim 22, wherein the pre-determined algorithm comprises a Longest Common Subsequence Windowed (LCSW) signature algorithm.

24. The system of claim 22, wherein the instructions when executed by the processor further comprises functionalities for:
generating a string by concatenating a plurality of attributes of the target to the first identifier,
wherein the plurality of attributes of the target are stored in a target profile of the target,
wherein similarity measure is further determined by comparing the second identifier to the string using the $LCS^W$ signature algorithm, and
wherein the plurality of attributes of the target are determined based in part by searching the target data of the target using the plurality of parsing rules.

25. The system of claim 23, wherein the instructions when executed by the processor further comprises functionalities for:
generating an alpha-text string and a numerical string from the string,
wherein the similarity measure is further determined by at least one selected from a group consisting of comparing a alpha-text portion of the second identifier to the alpha-text string using the $LCS^W$ signature algorithm and comparing a numerical portion of the second identifier to the numerical string using the $LCS^W$ signature algorithm.

26. The system of claim 22,
wherein the second identifier is found in a user profile portion of the first public webpage, and wherein the user profile portion of the first public webpage is identified based on the first parsing rule associated with the first Internet site.

27. The system of claim 22, wherein collecting information of the target based on the second identifier comprises:
   accessing, based on the second handle, a second public webpage in a second Internet site identified based on the second domain; and
   extracting content of the second public webpage for including in the target data of the target, wherein the content of the second public webpage is extracted using a second parsing rule, of the plurality of parsing rules, associated with the second Internet site.

28. The system of claim 22, wherein collecting information of the target based on the second identifier comprises:
   intercepting, based on the second handle, a document associated with the target from a private portion of the communication network traffic identified based on the second domain; and
   extracting content of the document for including in the target data of the target, wherein the content of the document is extracted using a second parsing rule, of the plurality of parsing rules, associated with the private portion of the communication network traffic identified based on the second domain.

29. The system of claim 28, wherein the document comprises at least one selected from a group consisting of an email, a telephone recording, and a VoIP recording.

30. The system of claim 22, wherein the instructions when executed by the processor further comprises functionalities for:
   storing the second identifier in the target profile of the target;
   detecting the second identifier in another target profile of another target comprising another user of the communication network by searching a plurality of target profiles of a plurality of targets comprising a plurality of users of the communication network;
   merging the target profile of the target with the another target profile; and;
   merging the target data of the target with target data of the another target.

31. The system of claim 30, wherein the instructions when executed by the processor further comprises functionalities for:
   determining a biometric identifier of the target by analyzing the target data of the target using at least one selected from a group consisting of speaker recognition algorithm, authorship recognition algorithm, and facial recognition algorithm; and
   determining an identity of the target based on the biometric identifier.

32. The system of claim 19,
   wherein the target profile further comprises an associate list of the target;
   wherein the instructions when executed by the processor further comprises functionalities for:
      determining, using the CPU, the second identifier by further searching target data of a plurality of associates in the associate list of the target using the plurality of parsing rules.

33. The system of claim 19,
   wherein the target profile further comprises an associate list of the target;
   wherein the instructions when executed by the processor further comprises functionalities for:
      determining a third identifier by searching the first public webpage using the first parsing rule, wherein the third identifier comprises a third domain and a third handle;
      determining, using the association retrieval engine, the third identifier as belonging to an associate of the target, wherein the associate comprises another user of the communication network, wherein the third identifier is determined as belonging to the associate by applying a plurality of association rules to the target data of the target with respect to the another user;
      adding the another user to the list of associates of the target; and
      adding the third identifier to the list of identifiers belonging to associates of the target.

34. The system of claim 33, further comprising:
   determining at least one selected from a group consisting of relationships, topics, and localities by analyzing the target data of the target,
   wherein the plurality of association rules comprise at least one selected from a group consisting of a relational association rule, a topical association rule, and a spatial association rule.

* * * * *